US005658108A

United States Patent [19]

Swick

[11] Patent Number: 5,658,108

[45] Date of Patent: *Aug. 19, 1997

[54] ELECTRICAL CONNECTION TERMINAL ASSEMBLY AND TILT WASHER

[76] Inventor: E. Grant Swick, 28W629 Stearns Rd., Bartlett, Ill. 60603

[ * ] Notice: The term of this patent shall not extend beyond the expiration date of Pat. No. 5,470,183.

[21] Appl. No.: 561,440

[22] Filed: Nov. 21, 1995

Related U.S. Application Data

[63] Continuation-in-part of Ser. No. 155,387, Nov. 22, 1993, Pat. No. 5,470,183.

[51] Int. Cl.[6] ............................ F16B 33/00; F16B 39/24; H01R 11/01

[52] U.S. Cl. .......................... 411/368; 411/160; 411/533; 411/959; 439/782

[58] Field of Search .................................... 411/160, 161, 411/368, 533, 957, 959; 439/781, 782

[56] References Cited

U.S. PATENT DOCUMENTS

| | | | |
|---|---|---|---|
| 3,398,393 | 8/1968 | Cochrum | 439/782 |
| 3,891,296 | 6/1975 | Gutshall | 439/782 |
| 3,993,397 | 11/1976 | Gutshall | 411/160 X |
| 4,135,777 | 1/1979 | Barth | 439/782 |
| 4,146,289 | 3/1979 | Kirrish | 439/781 X |
| 4,174,148 | 11/1979 | Oguch et al. | 411/160 X |
| 4,310,214 | 1/1982 | Carlson | 439/781 |
| 4,492,422 | 1/1985 | Bieschke | 439/781 X |

*Primary Examiner*—Neill R. Wilson
*Attorney, Agent, or Firm*—J. E. Brunton

[57] ABSTRACT

An electrical terminal clamping assembly of the character that will simultaneously accommodate and securely grip one or more conductor wires of substantially different diameters. The assembly includes a threaded terminal screw and a uniquely configured clamping plate or tilt washer which is adapted to freely tilt relative to the undersurface of the head of the terminal screw in a manner to move gripping projections provided on the undersurface of the washer into secure clamping engagement with a wire of large diameter disposed on one side of the axial center line of the terminal screw and into secure clamping engagement with a wire of much smaller diameter disposed on the opposite side of the axial center line. The undersurface of the tilt washer is provided with uniquely configured, generally circularly shaped gripping protuberances that provide multiple contact points for firmly gripping the different diameter conductor wires which are disposed on opposite sides of the terminal screw.

31 Claims, 24 Drawing Sheets

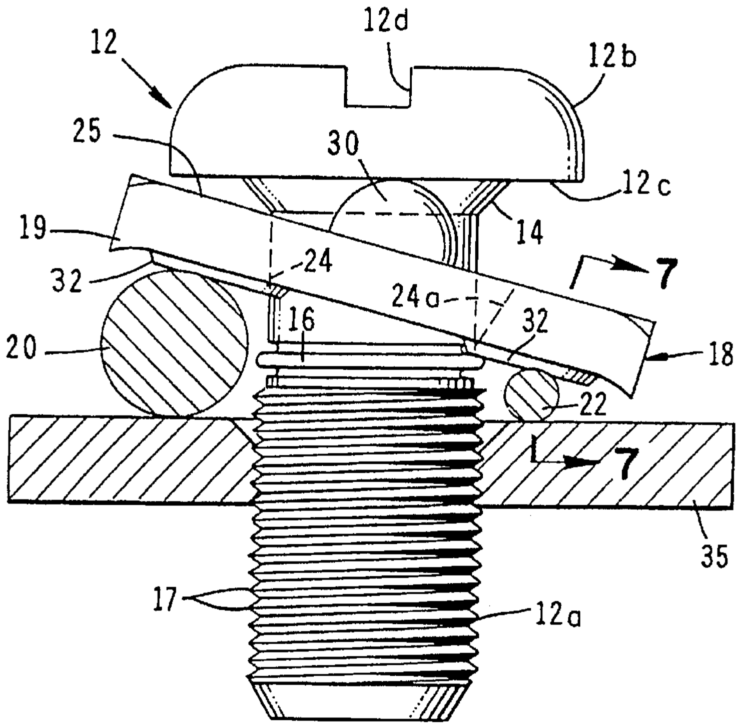
FIG. 1
FIG. 2
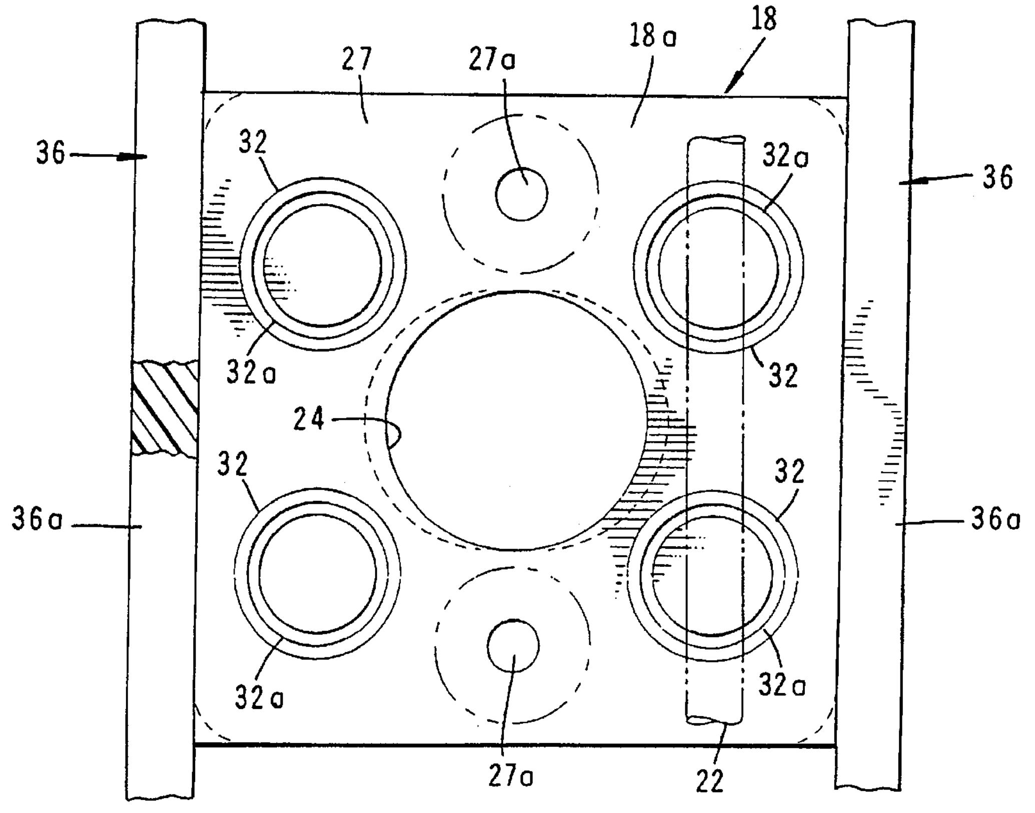

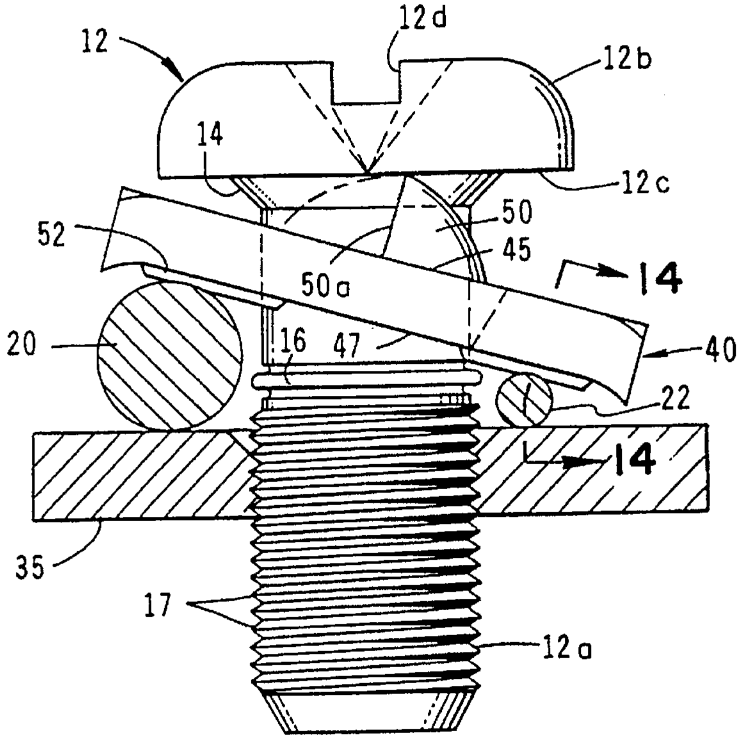
FIG. 8
FIG. 9
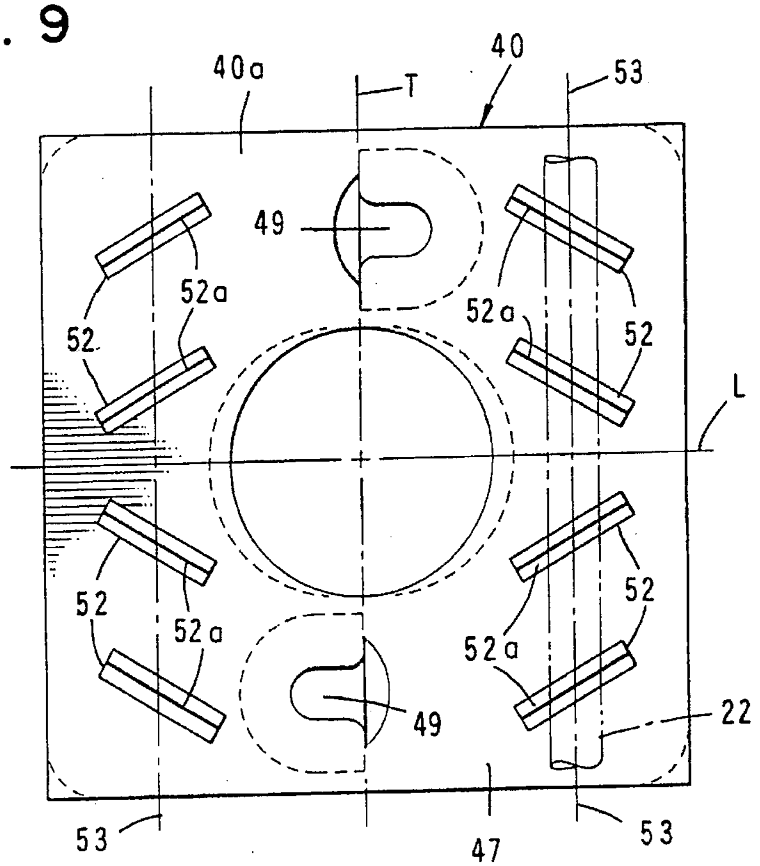

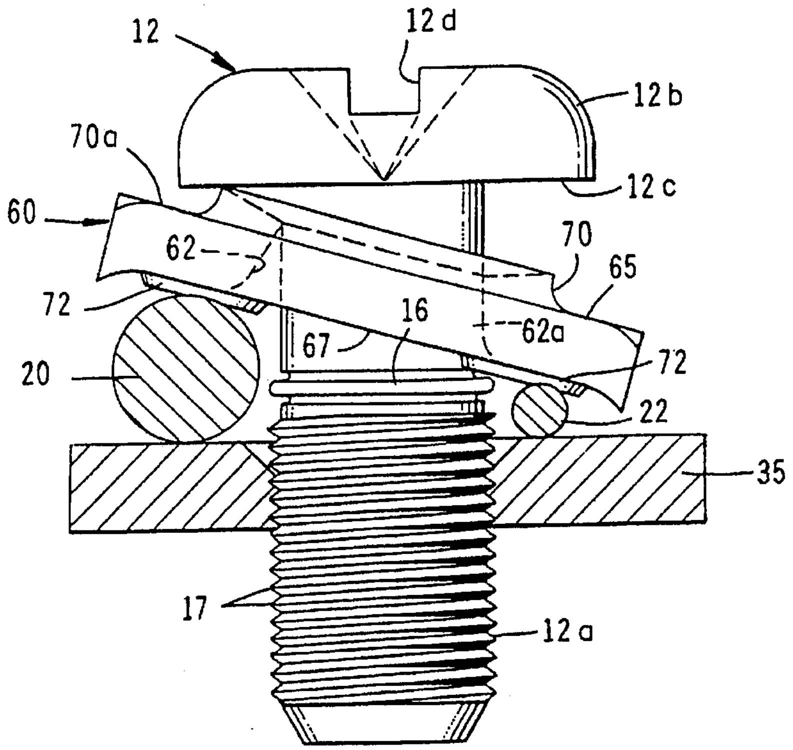
FIG. 15
FIG. 16
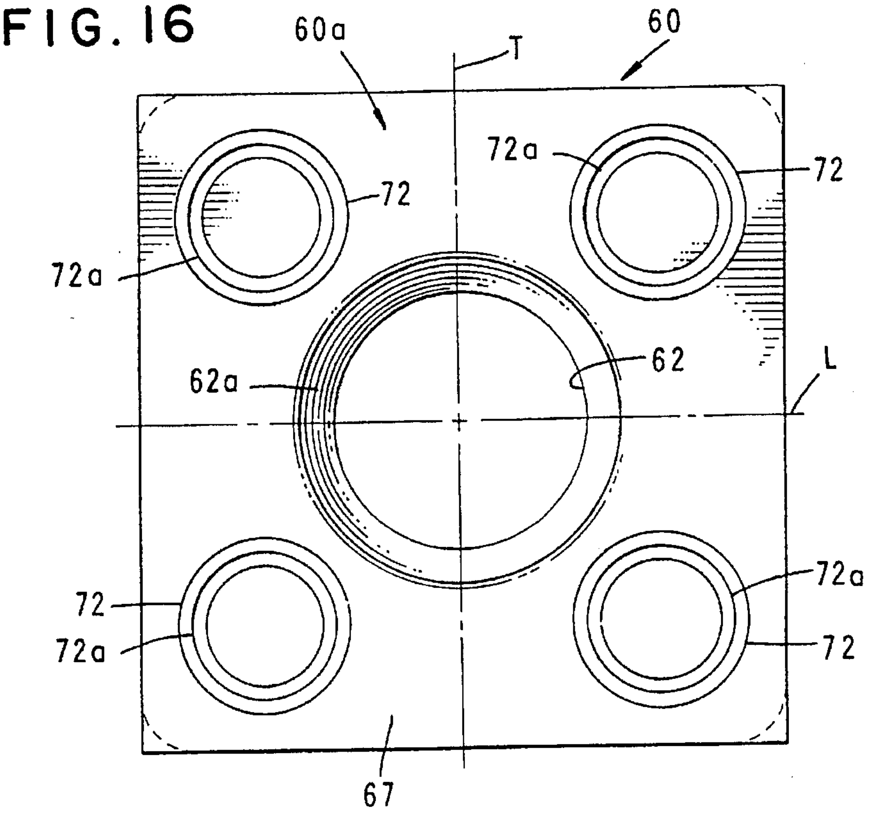

FIG. 50
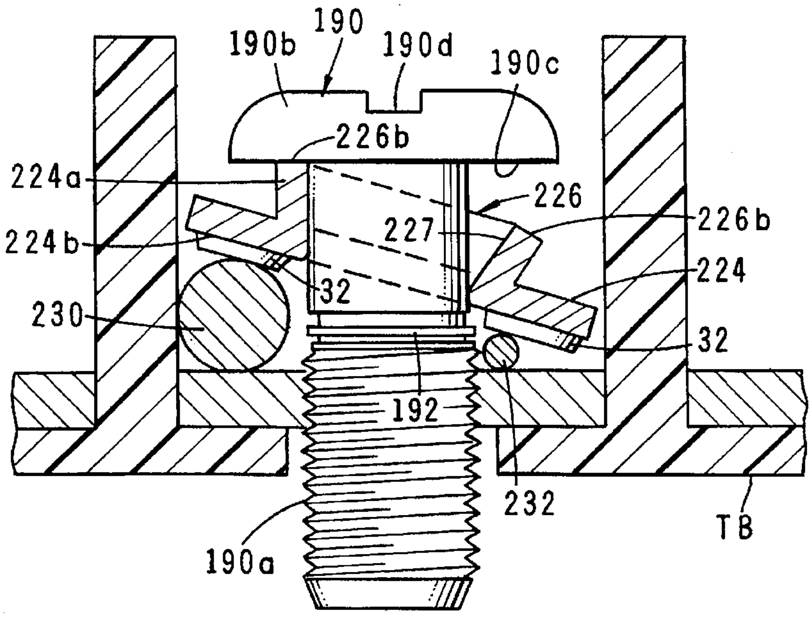
FIG. 51
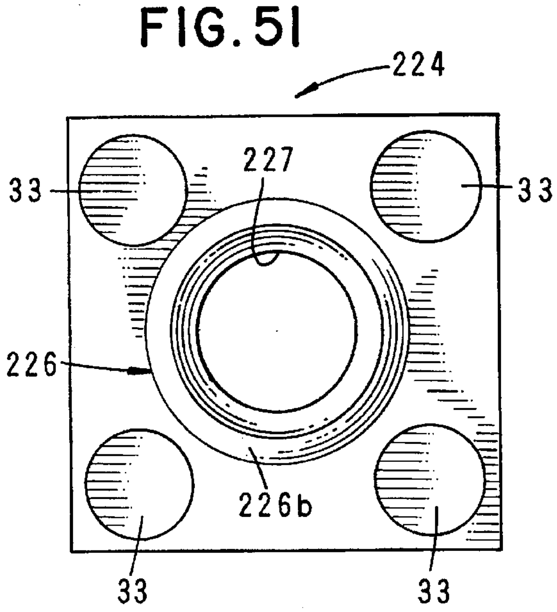
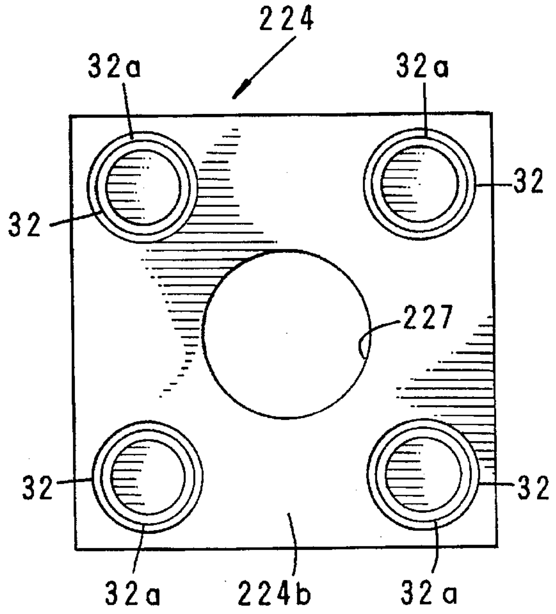
FIG. 52

FIG. 53
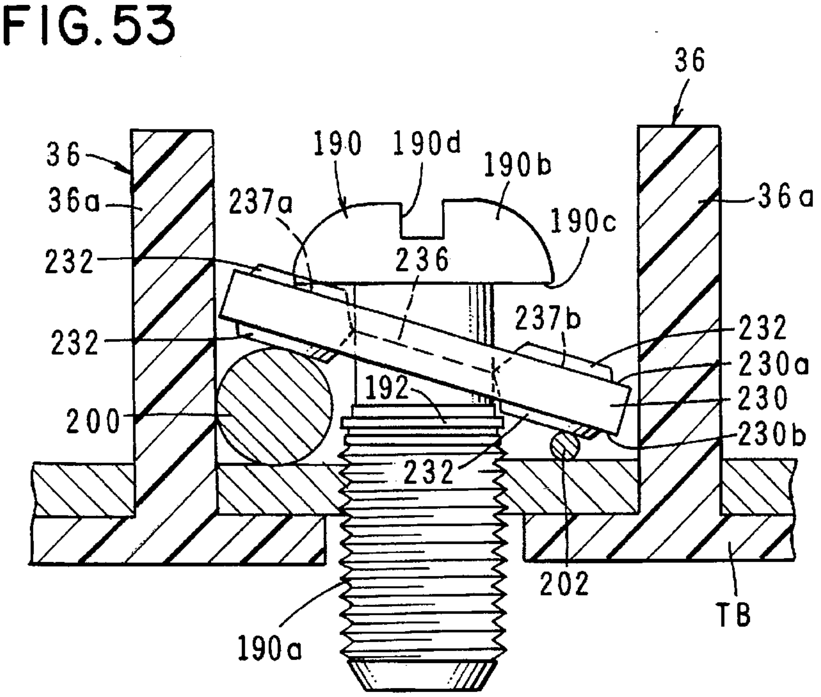
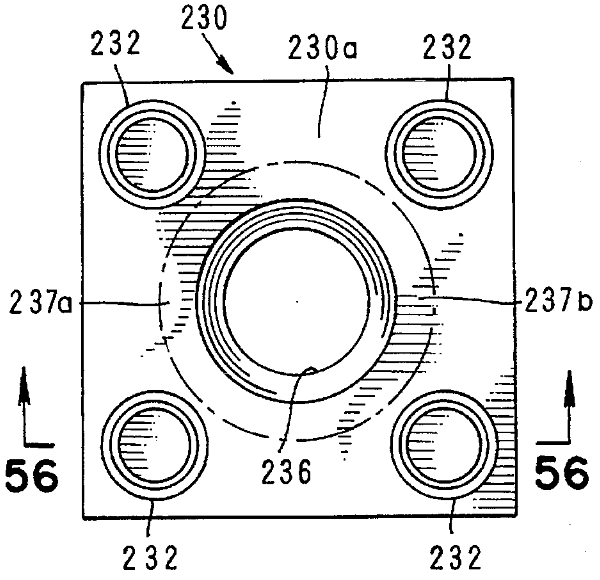
FIG. 54
FIG. 55
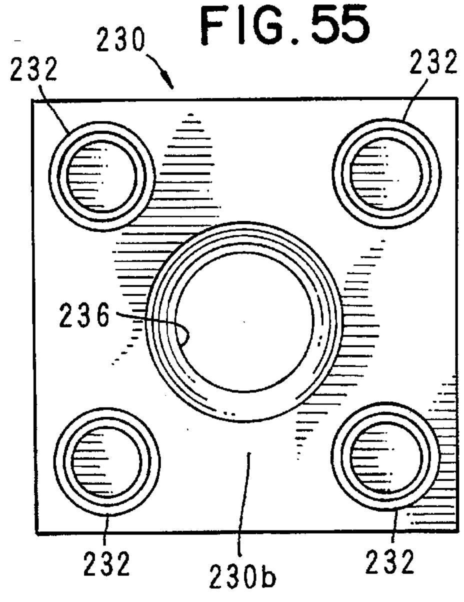
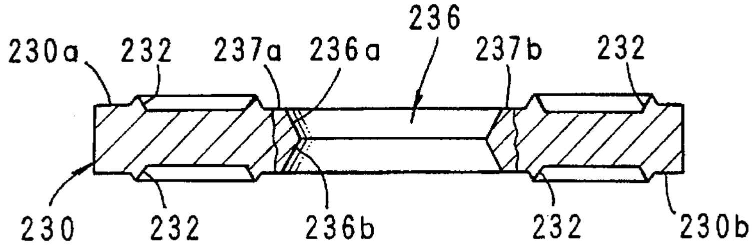
FIG. 56

FIG. 57
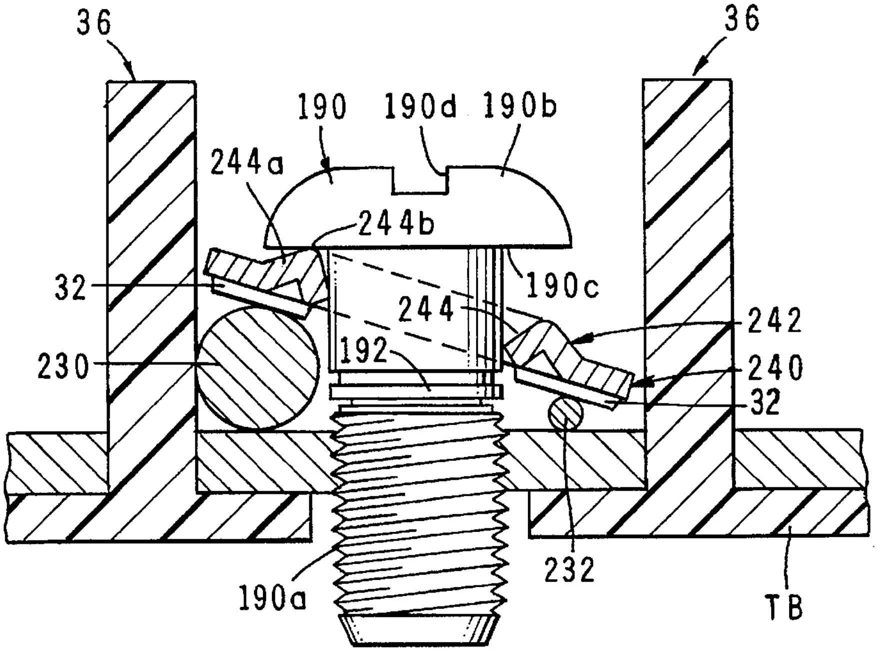
FIG. 58
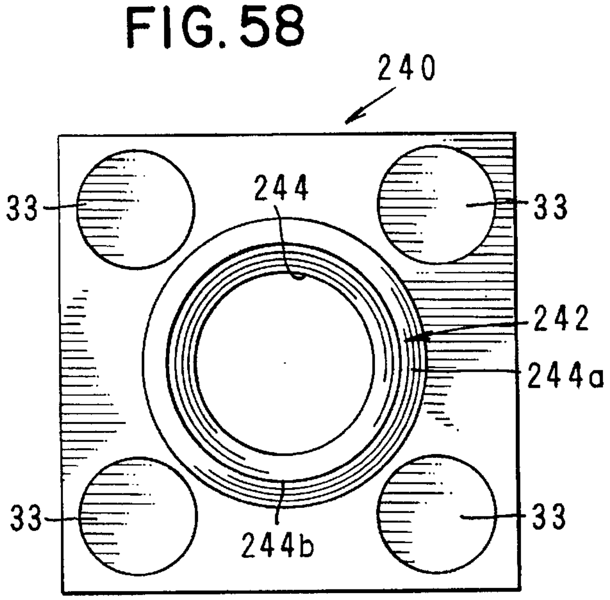
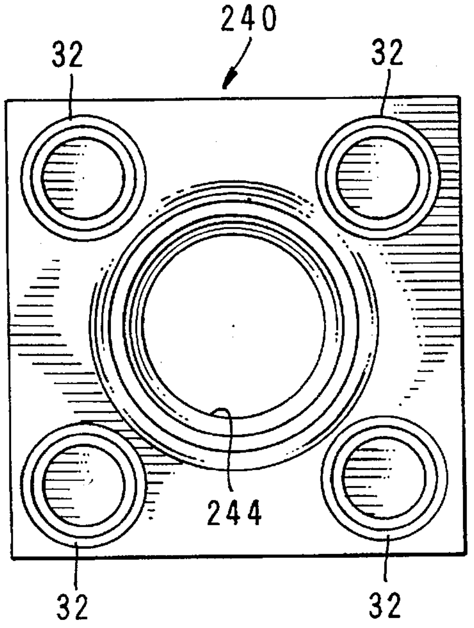
FIG. 59

FIG. 60
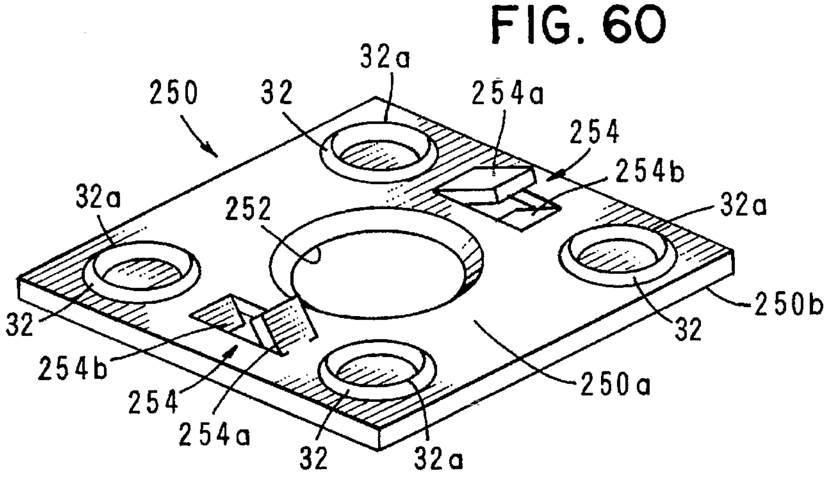
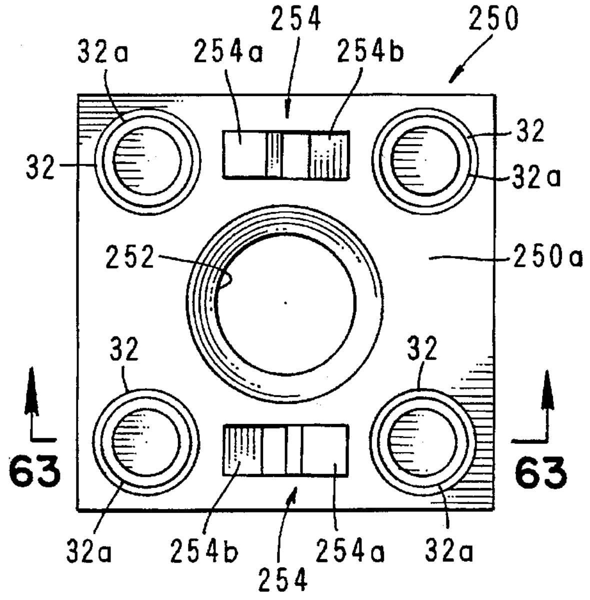
FIG. 61
FIG. 62
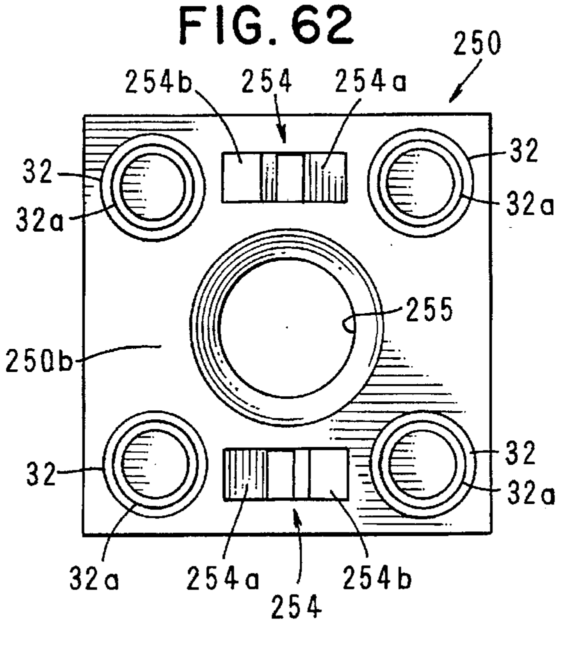
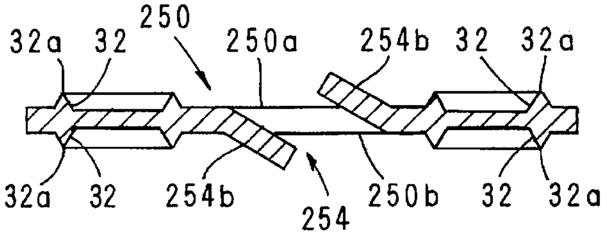
FIG. 63

ELECTRICAL CONNECTION TERMINAL ASSEMBLY AND TILT WASHER

SPECIFICATION

This is a continuation-in-part of application Ser. No. 08/155,387 filed Nov. 22, 1993 now U.S. Pat. No. 5,470, 183.

BACKGROUND OF THE INVENTION

1. Field of the Invention

The present invention relates generally to terminal clamp assemblies for clamping conductor wires of different sizes to a terminal block. More particularly, the invention concerns an electrical connection terminal assembly that includes a tilt or teetering washer of novel construction that tilts relative to the terminal screw proximate the axial center line thereof.

2. Discussion of the Invention

A number of different types of terminal clamp assemblies have been suggested in the past. Typically, the prior art assemblies comprise a screw and a clamping plate which is loosely mounted on the screw shank for tilting or teetering relative to the shank to accommodate wires of different sizes. Many of the prior art devices incorporate a rib structure at the undersurface of the washer to concentrate a clamping pressure on the conductor wires in an attempt to insure a positive and secure electrical contact.

In certain prior art devices, tiltability of the clamping plate or tilt washer has been achieved by providing a particularly designed clamping surface beneath the head of the screw. U.S. Pat. No. 3,744,012 issued to Gutshall is exemplary of this type of construction. Another prior art construction is described in U.S. Pat. No. 4,310,214 issued Carlson, wherein a clamp plate or washer is provided with four angularly-spaced, raised embossments which project above the upper surface of the clamp plate for engagement with a circular protrusion formed on the undersurface of the head of the screw. In yet another prior device, which is described in U.S. Pat. No. 3,135,777 issued to Barth, the clamping member is provided with a tube like protuberance which terminates in an edge that engages the undersurface of the screw head and permits the washer to tilt about a location disposed proximate the shank of the terminal screw. Other, more complicated and elaborate terminal connector assemblies, are described in U.S. Pat. No. 3,470,526 issued to Joly and in U.S. Pat. No. 3,081,507 issued to Gribble.

The prior art terminal clamp assemblies typically suffer from one or more shortcomings. For example, some are unduly complex, are difficult to use and are expensive to manufacture. Others lack in reliability in that they do not positively grip wires of different sizes. In this regard most electrical terminal clamp assemblies are subject to Underwriters Laboratory requirements. One of these requirements provides that certain terminal clamp assemblies be capable of grasping a 14 gauge wire on one side of the screw and a 22 gauge wire on the other side of the screw. In order to meet this requirement, the washer must tip or tilt substantially relative to the screw so that both the large and small conductor wires are securely clamped. Because the tilt washers in the prior art devices typically pivot about points located closely adjacent the edge of the shank of the screw and closely adjacent the center of the larger wire, the washer often cannot be effectively forced into secure clamping engagement with the small wires.

The device of the present invention uniquely and elegantly solves most of the problems inherent in the prior art devices by designing the tilt washer in a manner so that it freely tips relative to the undersurface of the screw head at locations proximate the axial center line of the screw. This novel construction enables the washer to tilt in a manner to effectively grip both the large and small diameter wires which are disposed on either side of the axial center line. To enhance the gripping abilities of the washer, the undersurface thereof is provided with uniquely configured and arranged gripping projections Which positively and securely grip both the large and small diameter wires.

SUMMARY OF THE INVENTION

It is an object of the present invention to provide a terminal clamping assembly of the character that will simultaneously accommodate and securely grip one or more conductor wires of substantially different diameters.

More particularly, it is an object of the invention to provide an assembly of the aforementioned character which includes a uniquely configured clamping plate or tilt washer which is adapted to tilt freely relative to the undersurface of the screw head proximate the axial center line of the screw so as to move gripping projections provided on the undersurface of the washer into secure clamping engagement with a wire of large diameter disposed on one side of the axial center line of the screw and into positive clamping engagement with a wire of much smaller diameter disposed on the opposite side of the axial center line.

Another object of the invention is to provide an assembly as described in the preceding paragraphs in which the undersurface of the tilt washer is provided with uniquely configured gripping protuberances of various types that provide multiple contact points for firmly gripping the different diameter conductor wires which are disposed on opposite sides of the terminal screw.

Another object of the invention is to provide a terminal connector assembly which is of a simple, straight-forward design and one that can be easily and inexpensively manufactured in large volume.

Another object of the invention is to provide a device of the class described which is easy to use, is automatically and correctly oriented and positively resists loosening even in environments of substantial vibration.

DESCRIPTION OF THE DRAWINGS

FIG. 1 is a side-elevational, partial cross-sectional view illustrating one form of the connector assembly construction of the invention.

FIG. 2 is an enlarged bottom plan view of the wire clamping plate or housing of the washer of FIG. 1 which is disposed within a plastic housing that functions to prevent rotation of the washer during tightening of the terminal screw.

FIG. 8 is a side-elevational, partial cross-sectional view of another form of connector assembly of the present invention.

FIG. 9 is a bottom plan view of the washer of FIG. 8.

FIG. 15 is a side-elevational, cross-sectional view of yet another embodiment of the connector assembly of the invention.

FIG. 16 is a bottom plan view of the washer shown in FIG. 15.

FIG. 50 is a side-elevational, partial cross-sectional view of yet another embodiment of the connector assembly construction of the invention.

FIG. 51 is a top plan view of the washer portion of the connector assembly shown in FIG. 50.

FIG. 52 is a bottom plan view of the washer portion of the connector assembly shown in FIG. 50.

FIG. 53 is a side-elevational, partial cross-sectional view illustrating yet another form of the connector assembly construction of the invention.

FIG. 54 is a top plan view of the washer portion of the connector assembly shown in FIG. 53.

FIG. 55 is a bottom plan view of the washer portion of the connector assembly shown in FIG. 53.

FIG. 56 is a cross-sectional view taken along lines 56—56 of FIG. 54.

FIG. 57 is a side-elevational, partial cross-sectional view illustrating still another form of the connector assembly construction of the invention.

FIG. 58 is a top plan view of the washer portion of the connector assembly shown in FIG. 57.

FIG. 59 is a bottom plan view of the connector assembly construction shown in FIG. 57.

FIG. 60 is a generally perspective view of another form of tilt washer of the invention.

FIG. 61 is a top plan view of the washer shown in FIG. 60.

FIG. 62 is a bottom plan view of the washer shown in FIG. 60.

FIG. 63 is a cross-sectional view taken along lines 63—63 of FIG. 61.

DESCRIPTION OF THE INVENTION

Figure 3:
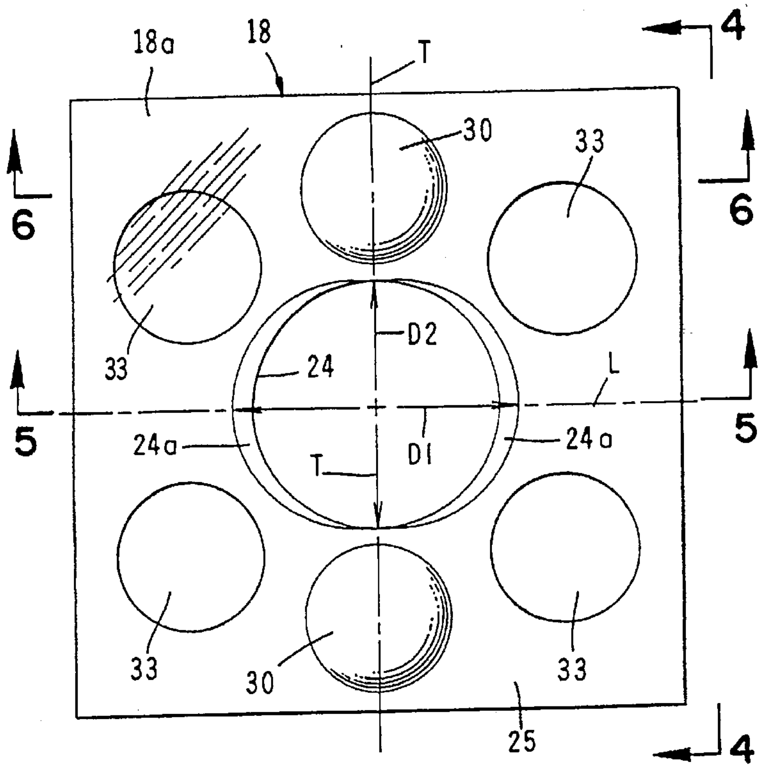
FIG. 3 is a top plan view of the washer of FIG. 1.

Referring to the drawings and particularly to FIGS. 1 through 7, one form of the electrical connector assembly of the present invention is there illustrated. As best seen by referring to FIGS. 1 through 4, this embodiment of the invention comprises a threaded member such as a screw 12 having a shank portion **12*a* and a head portion 12*b*. Head portion 12*b* has a generally flat, annular-shaped undersurface 12*c* and is provided with a tool-engaging slot 12*d*. Slot 12*d* can be a standard screw driver slot, a "Phillips" slot or a combination thereof. A chamfer 14 is formed intermediate surface 12*c* and shank portion 12*a*. Chamfer 14 greatly increases the head to shank strength, especially with "Phillips" head screws. An annular-shaped collar 16, the purpose of which will presently be described, is formed on shank 12*a*** at a location above the threaded portion thereof.

Disposed between collar 16 and chamfer 14 is wire clamping means shown here as a clamping plate or tilt washer 18 which is adapted to securely clamp electrical conductors or wires of the same or differing diameters. In FIG. 1, the conductors are shown as a large diameter, solid wire conductor 20 and a small diameter, solid wire conductor 22.

Figure 5:
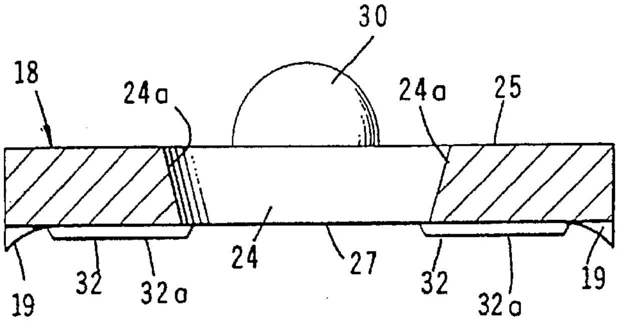
FIG. 5 is a cross-sectional view taken along lines 5—5 of FIG. 3.

As best seen by referring to FIG. 3, washer 18 has a transversely extending center line "T" and a longitudinally extending center line "L" and includes a body portion **18*a* provided with a centrally disposed aperture 24. As indicated in FIG. 5, aperture 24 is provided with a sloping side wall 24*a* that interconnects the upper and lower surfaces of the washer designated in FIG. 5 by the numerals 25 and 27 respectively. As best seen in FIG. 3, at the upper surface of the washer, aperture 24 has a first axis D-1 measured along the longitudinally extending center line of the washer and a second axis D-2 measured along the transversely extending center line of the washer. At the lower surface of the washer, aperture 24 is generally circular. To enable the washer to tilt freely about the upper portion of shank 12*a*, axis D-1 is formed somewhat larger than axis D-2. In the drawings, wall 24*a*** is shown as sloping downwardly and inwardly. It is to be understood the walls could slope upwardly as well so as to permit the washer to tilt freely. Additionally, the aperture could also take the form of an elliptical through hole.

Figure 4:
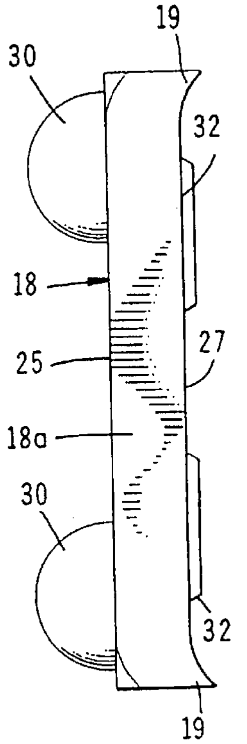
FIG. 4 is a view taken along lines 4—4 of FIG. 3.
Figure 6:
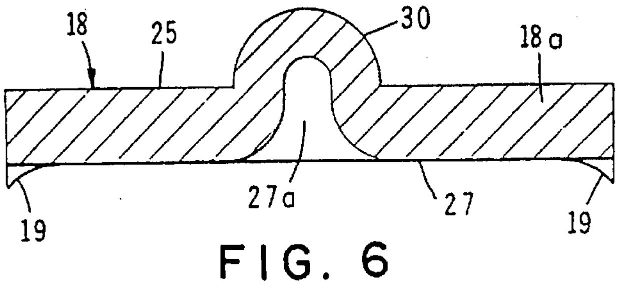
FIG. 6 is a cross-sectional view taken along lines 6—6 of FIG. 3.

Turning particularly to FIGS. 1 and 4, it is to be noted that upper surface 25 of the tilt washer is provided with screw head engaging means about which the body portion of the washer can tilt relative to the head of the screw 12. In the embodiment of the invention shown in FIGS. 1 through 7, this screw head engaging means comprises a pair of transversely, spaced-apart, upstanding protuberances 30 which are disposed on either side of longitudinal center line "L". Turning to FIG. 6, it can be seen that each of the protuberances 30 is formed by an appropriate forming tool which is brought into pressural engagement with the lower surface 27 of the washer at a location **27*a*** in a manner to deform or upset the metal acted upon by the forming tool into a generally hemispherical shape of the character shown in the drawings.

Figure 7:
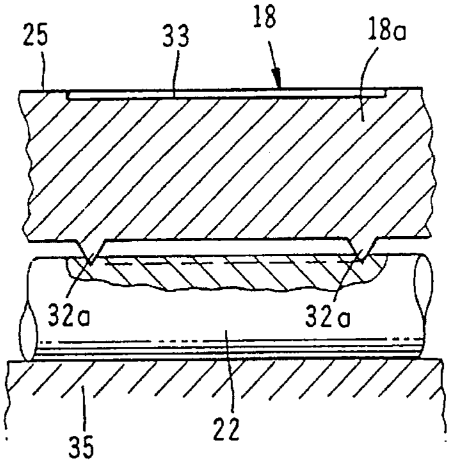
FIG. 7 is a greatly enlarged, fragmentary, cross-sectional view taken along lines 7—7 of FIG. 1.

Provided on the lower surface 27 of the gripping plate, or washer body **18*a*, is gripping means for positively gripping the wire conductors 20 and 22. In the form of the invention shown in FIGS. 1 through 7, the gripping means comprise four spaced-apart, generally circular-shape gripping protuberances 32, each of which is provided with a generally circular shaped,, upstanding gripping ridge 32*a*. As best seen in FIG. 7, each of the gripping ridges 32*a* terminates in a relatively sharp edge which is adapted to bite into and securely grip the wire conductor with which it is forced into contact. In FIG. 7, the edges of ridges 32*a* are shown partly protruding into the wire. Typically, further tightening of the screw will cause complete penetration of the edges into the wire so as to grip it securely and form a gas tight contact. This feature is important because, in recent years, wire manufactures have, in many cases, eliminated the final anneal making the wires somewhat "stiffer" thereby making it doubly important to generate sufficient clamping pressures to insure a gas tight seal. Ridges 32*a* can have a small radius on the tip and can be formed by various methods well known to those skilled in the art, but preferably are formed by a coining process which deforms the upper and lower surfaces of the washer in the manner illustrated in FIG. 7. (Note circular depressions 33 formed in surface 25 during the coining step.) While various arrangements of wire-engaging gripping protuberances can be formed on the lower surface of the washer, the construction illustrated in the drawings is preferred. In this arrangement, two pair of protuberances are provided on the second surface of the washer, one pair being disposed on one side of the longitudinally extending center line of body 18*a* and the other being disposed on the opposite side of the longitudinally center line. As best seen in FIG. 4, the marginal corners 19 of body 18*a*** are downturned. For certain applications, the entire edges of the body can be downturned if desired.

Turning once again to FIG. 1 and 2, in manufacturing the electrical connector assembly of the form of the invention there shown, the unthreaded shank of a semi-finished screw member is initially inserted through aperture 24 of the completely formed washer 18. The annular collar 16, along with the threads 17, are then preferably formed on the shank of the screw member by a rolling process of the character well known to those skilled in the art. As indicated in the drawings, the diameter of annular collar 16 is slightly larger than the diameter of aperture 24 so that the washer will be held captive between the collar and the undersurface **12*c* of the screw head. Due to the generally elliptical configuration of aperture 24, washer 18 is free to tilt or tip relative to the screw. Stated another way, when, during tightening of the screw, the head engaging means, or dome members 30, are forced into engagement with the undersurface 12***c* of the screw head, the washer remains free to tilt relative to the screw as the members move relative to the undersurface 12*c* of the screw head (see FIG. 1). Unlike the prior art constructions, wherein the tilt washers typically pivot about points located closely adjacent to the shank of the screw, the tilt washer of the present invention is uniquely adapted to tilt about points located much closer to the center of the screw.

With the construction thus described, prior to tightening the screw to the terminal 35 (FIG. 1), the conductor wires 20 and 22 are inserted between the terminal and the washer in the manner shown in FIGS. 1, 2 and 7 so that the wires span the gripping protuberances. As the screw is tightened relative to the terminal, the screw head engaging means, or protuberances 30, move into engagement with the undersurface 12*c* of the screw head and one pair of gripping means move into engagement with the larger diameter electrical conductor 20. Continued tightening of the screw will cause the washer to tilt or pivot relative to undersurface 12*c* of the screw head in the manner shown in FIG. 1. As the washer tilts, the second pair of gripping protuberances move into gripping engagement with the smaller diameter electrical conductor 22. A continued tightening of the screw will then cause the washer to bite into and securely grip both the larger diameter and smaller diameter electrical conductors. As indicated in FIG. 2, in one form of the invention, the terminal block includes means for preventing rotation of the washer as the screw is rotated. This means is here provided in the form of a plastic housing 36 which surrounds the assemblage comprising the screw 12 and the washer 18. Housing 36 includes upstanding walls 36*a* which engage the edges of the washer to prevent it from rotating during the tightening of the screw. While a housing 36 is not required in all cases, for certain applications the provision of means for blocking rotational movement of the washer may be desirable. This rotation preventing means can take several forms so long as the washer is blocked from rotating about the shank of the screw.

Turning now to FIGS. 8 through 14, another form of the electrical connector assembly of the present invention is there illustrated. This form of the invention is similar in many respects to that shown in FIGS. 1 through 7 and like numbers have been used to identify like elements. For example, this embodiment of the invention also includes a threaded member or screw 12 having the same general configuration previously described.

Disposed between collar 16 and chamber 14 of the screw is wire clamping means shown here as a clamping plate or tilt washer 40 which is of slightly different construction than previously described washer 18.

Figure 10:
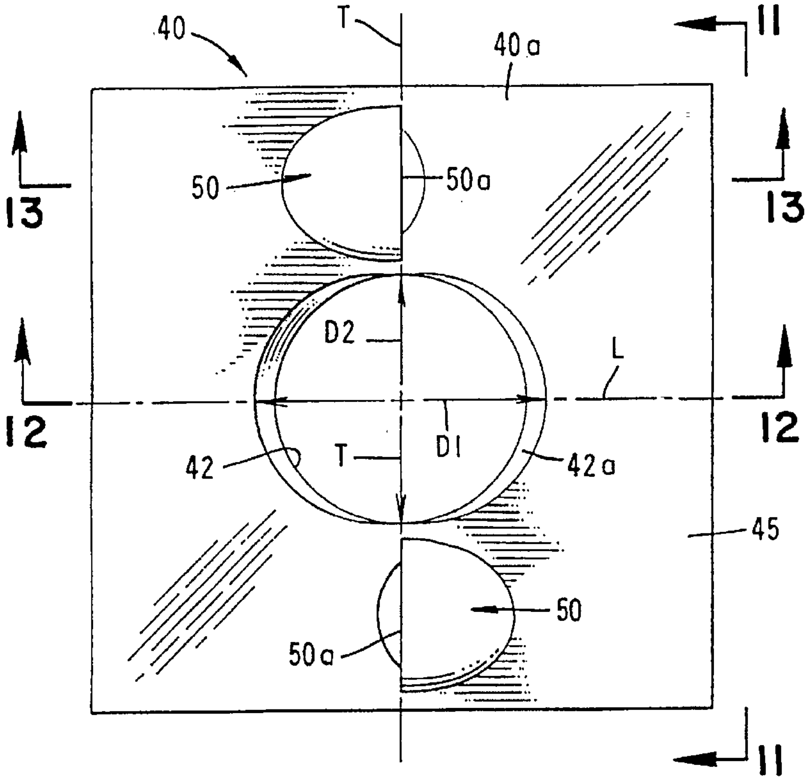
FIG. 10 is a top plan view of the washer of FIG. 8.

As best seen by referring to FIG. 10, washer 40 has a transversely extending center line "T" and a longitudinally extending center line "L" and includes a body central 40*a* having a centrally disposed aperture 42. As before, aperture 42 is provided with a sloping side wall 42*a* that interconnects the upper and lower surfaces of the washer designated in FIG. 8 by the numerals 45 and 47 respectively. As indicated in FIG. 9, aperture 42 has a first diameter or axis D-1 measured along the longitudinal center line of the washer and a second diameter or axis D-2 measured along the transverse center line of, the washer. To enable the washer to tilt, D-1 is once again larger than D-2.

Figure 11:
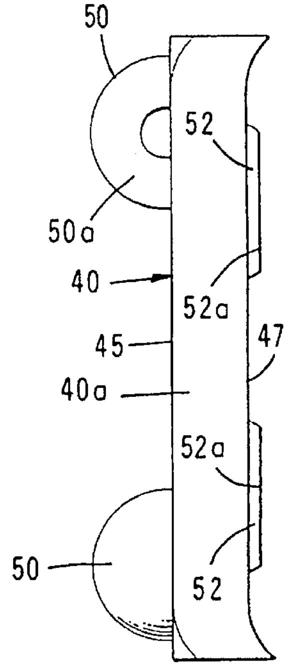
FIG. 11 is a view taken along lines 11—11 of FIG. 10.
Figure 12:
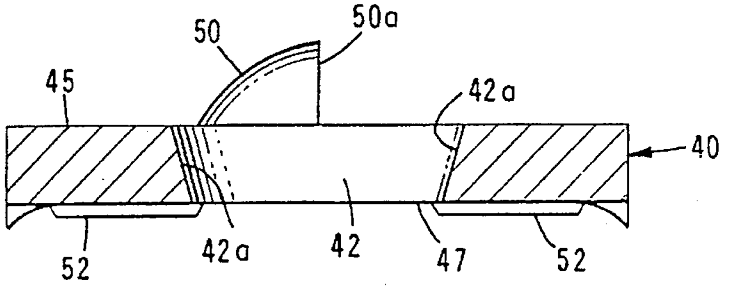
FIG. 12 is a cross-sectional view taken along lines 12—12 of FIG. 10.
Figure 13:
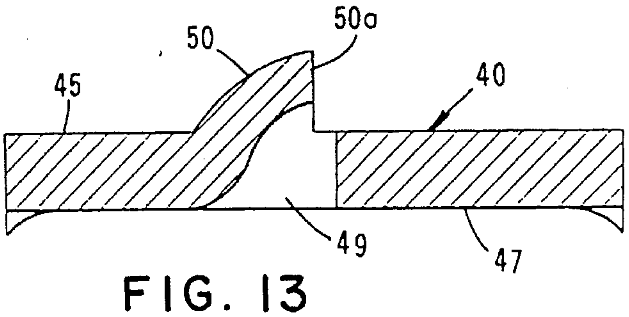
FIG. 13 is a cross-sectional view taken along lines 13—13 of FIG. 10.

Turning particularly to FIGS. 8, 11 and 13, it is to be noted that upper surface 45 of the tilt washer is provided with screw head engaging means of a slightly different configuration from those previously described. More particularly, in this latest embodiment of the invention, the screw head engaging means comprises a pair of transversely, spaced-apart, lanced out protuberances 50 which are disposed on either side of longitudinal center line "L" of the washer. Protuberances 50, which are generally "S" shaped in cross section, are formed by an appropriate forming tool which is brought into pressural engagement with the lower surface 47 of the washer at locations 49 in a manner to lance the metal in the area of the forming tool into the configuration shown in the drawings. Each protuberance 50 terminates in an arcuate line 50*a* which is generally in alignment with transversely extending center line "T".

Figure 14:
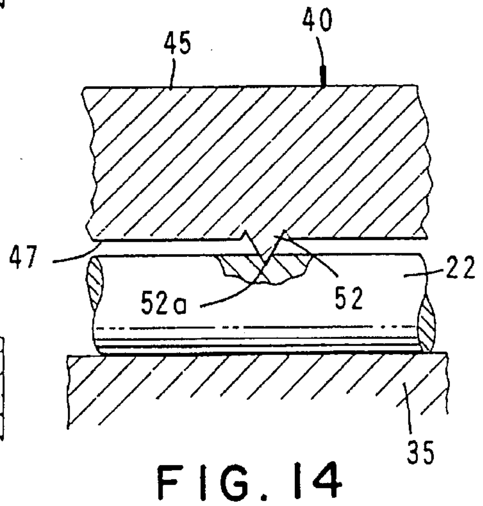
FIG. 14 is a greatly enlarged, fragmentary view taken along lines 14—14 of FIG. 3.

Provided on the lower surface 47 of the gripping plate, or washer body 40*a* is gripping means for gripping the wire conductors 20 and 22. In the form of the invention shown in FIGS. 8 through 14, the gripping means comprise a plurality of spaced-apart gripping members 52 which are disposed at an angle with respect to transverse lines 53 extending generally parallel to center line "T" (FIG. 9). As can be seen by also referring to FIGS. 11 and 14, each of the gripping members 52 is provided with an upstanding gripping ridge 52*a* which terminates in a relatively sharp edge that is adapted to securely grip and slightly penetrate the wire conductor with which it comes into contact (FIG. 14). Gripping members 52 can be formed in any suitable manner well known to those skilled in the art, but preferably are, once again, formed by a suitable coining process. While the gripping members can be arranged on the lower surface of the washer in various ways, the construction illustrated in FIG. 9, wherein four transversely spaced, angularly extending clamping members are provided on either side of the transversely extending center line of the washer body, has proven satisfactory for tightly gripping the conductor wires.

Turning once again to FIG. 8, washer 40 can be seen to be held captive between annular collar 16 and the undersurface 12*c* of the screw head 12*b* and because of the configuration of aperture 42, is free to tip or tilt relative to the screw in the manner shown in the drawings. As before, during tightening of the screw, the screw head engaging means, or upper extremities of protuberances 50, have moved into engagement with the undersurface 12*c* of the screw head and the washer is free to tilt relative to the undersurface 12*c* of the screw head. With the conductor wires 20 and 22 inserted between the terminal block and the washer in the manner shown in FIGS. 8 and 14 and spanning the gripping means or members 52, tightening of the terminal screw relative to the terminal block will cause the washer to tilt in a manner to move members 52 into secure gripping engagement with both the large and small wire conductors. At the same time, the upper edges of the half dimple shaped protuberances 50 will slightly dig into the undersurface of the screw head in a manner to impede loosening of the screw.

Referring to FIGS. 15 through 19, another form of the electrical connector assembly of the present invention is there illustrated. This form of the invention is also similar in many respects to that shown in FIGS. 1 through 7 and like numbers have been used to identify like elements. This embodiment of the invention also includes a threaded member or screw 12 having the same general configuration previously described but does not have the chamfer 14. Disposed between collar 16, and the undersurface of the screw head is wire clamping means shown here as a clamping plate or tilt washer 60 which is of slightly different construction than previously described washers 18 and 40.

Figure 17:
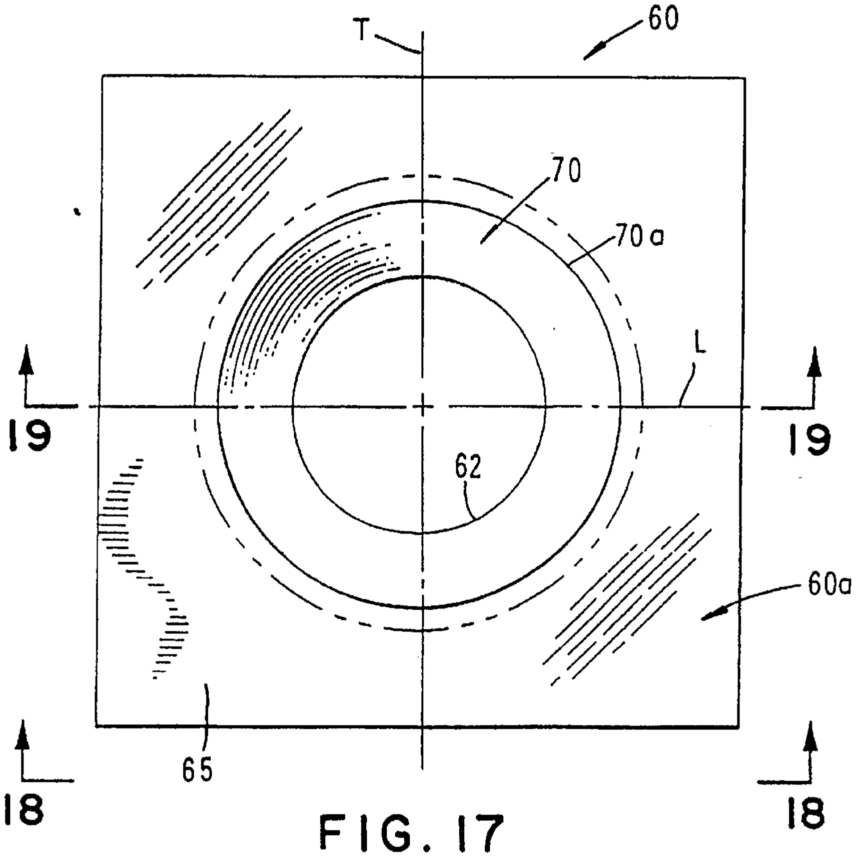
FIG. 17 is a top plan view of the washer of FIG. 15.

As best seen by referring to FIG. 17, washer 60 has a transversely extending center line "T" and a longitudinally extending center line "L" and includes a body portion 60*a* having a centrally disposed, generally circular aperture 62. As before, aperture 62 is provided with a sloping side wall 62*a* that interconnects the upper and lower surfaces of the washer designated in FIG. 15 by the numerals 65 and 67 respectively.

Figure 18:
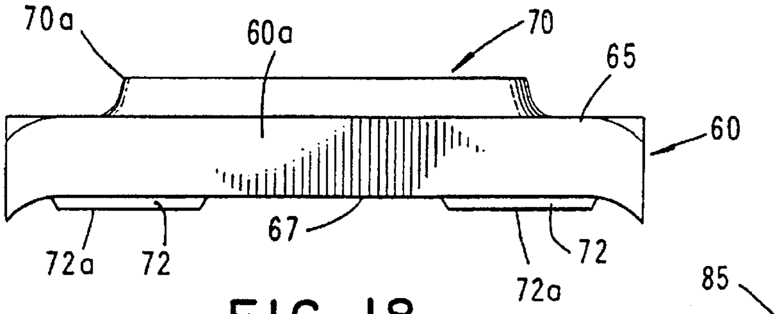
FIG. 18 is a view taken along lines 18—18 of FIG. 17.
Figure 19:
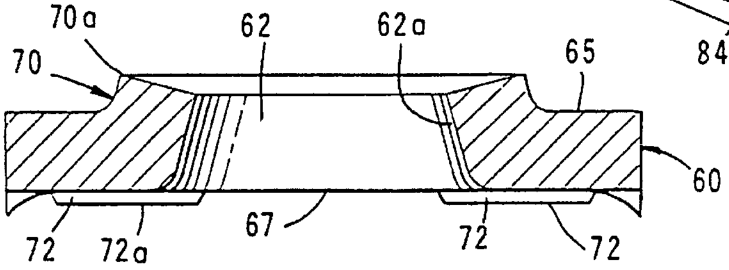
FIG. 19 is a cross-sectional view taken along lines 19—19 of FIG. 17.

Turning particularly to FIGS. 15, 18 and 19, it is to be noted that upper surface 65 of the tilt washer is provided with screw head engaging means of a slightly different configuration from those previously described. More particularly, in this latest embodiment of the invention the screw head engaging means comprises an upstanding collar like protuberance 70 which is concentric with aperture 62. Protuberance 70 is generally annular shaped and terminates in an upper, circular rim 70*a* (FIG. 19) which is adapted to engage undersurface 12*c* of the screw head as the washer tilts in the manner shown in FIG. 15.

Provided on the lower surface 67 of the gripping plate, or washer body 60*a*, is gripping means for positively gripping the wire conductors 20 and 22. In this latest form of the invention, the gripping means are similar to those shown in FIG. 1 through 7 and comprise four spaced-apart, generally circular-shape gripping protuberances 72, each of which is provided with a generally circular shaped, upstanding gripping ridge 72*a*. As best seen in FIGS. 7, 16 and 19, each of the gripping ridges 72*a* terminates in a relatively sharp edge which is adapted to bite into and securely grip the wire conductor with which it is forced into contact. Ridges 72*a* can be formed by various methods well known to those skilled in the art but, as before, are formed by a coining process. While various arrangements of wire gripping protuberances can be formed on the lower surface of washer 60, the construction illustrated in the drawings is preferred. In this arrangement, two pair of protuberances are provided on the second surface of the washer, one pair being disposed, on one side of the longitudinally extending center line of body 60*a* and the other being disposed on the opposite side of the longitudinally center line. As best seen in FIG. 15, the corners of body 60*a* are once again downturned.

Turning again to FIG. 15, washer 60 can be seen to be held captive between annular collar 16 and the undersurface 12*c* of the screw head 12*b* and because of the sloping side wall of aperture 62, and collar 70 is free to tilt relative to the screw shank. As before, during tightening of the screw, the screw head engaging means, or upper rim of protuberance 70 moves into engagement with the undersurface 12*c* of the screw head and the washer is free to tilt in the manner shown in FIG. 15.

With the conductor wires 20 and 22 inserted between the terminal block and the washer in the manner shown in FIG. 15 and the conductor wires spanning the gripping means, or members 72, tightening of the terminal screw relative to the terminal block will cause the washer to tilt in a manner to move members 72 into secure gripping engagement with both the large and small wire conductors.

Figure 20:
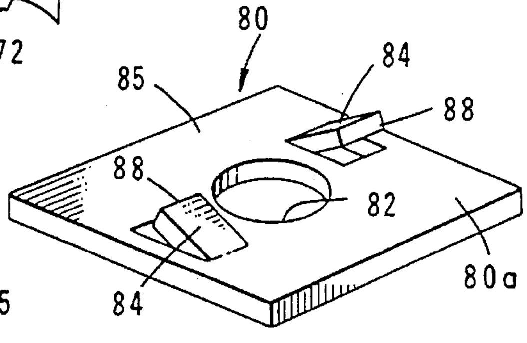
FIG. 20 is a generally perspective view of still another form of tilt washer of the invention.

Turning lastly to FIG. 20, still another form of tilt washer of the invention is there shown and generally designated by the numeral 80. This washer has a body 80*a* which is provided with a generally elliptical central aperture 82. The fulcrum means provided on this washer comprise a pair of spaced-apart, angularly upwardly extending, lanced-out tabs or members 84. Members 84 extend upwardly at an angle with respect to the upper surface 85 of the washer and terminate in relatively sharp edges 88 which are adapted to engage and bite into the undersurface of the screw head as the washer tilts relative to the screw head in the manner previously described herein. Edges 88 are constructed and arranged so that the washer can freely tilt relative to the screw head in the manner previously described and, when the screw is completely tightened, tend to resist loosening thereof.

It is to be understood that the screw head engaging means can also be of a variety of other configurations. For example, it can comprise dimples, half dimples or can comprise an upstanding collar having a sharply inclined wall terminating in a circular ridge.

Figure 22:
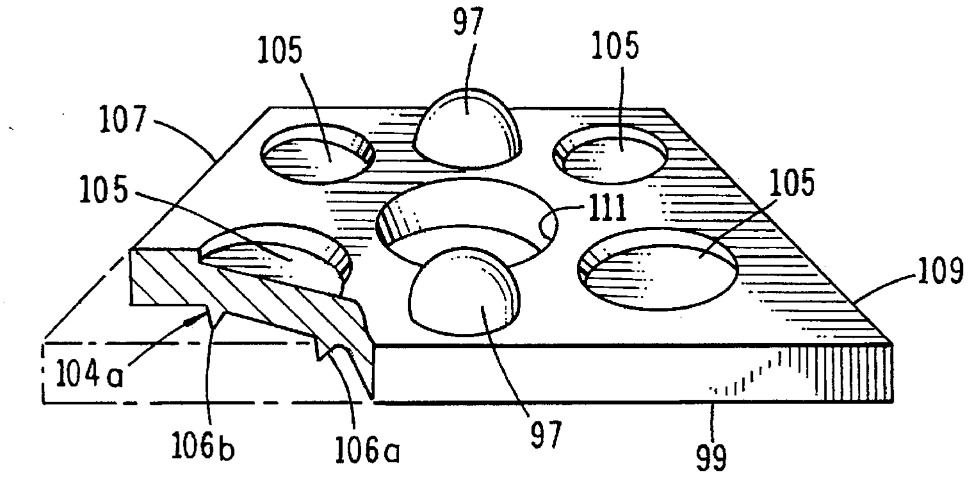
FIG. 22 is a generally perspective view of the washer portion of the construction shown in FIG. 21 partly broken away to illustrate the coining of one of the conductor engaging protuberances.
Figure 23:
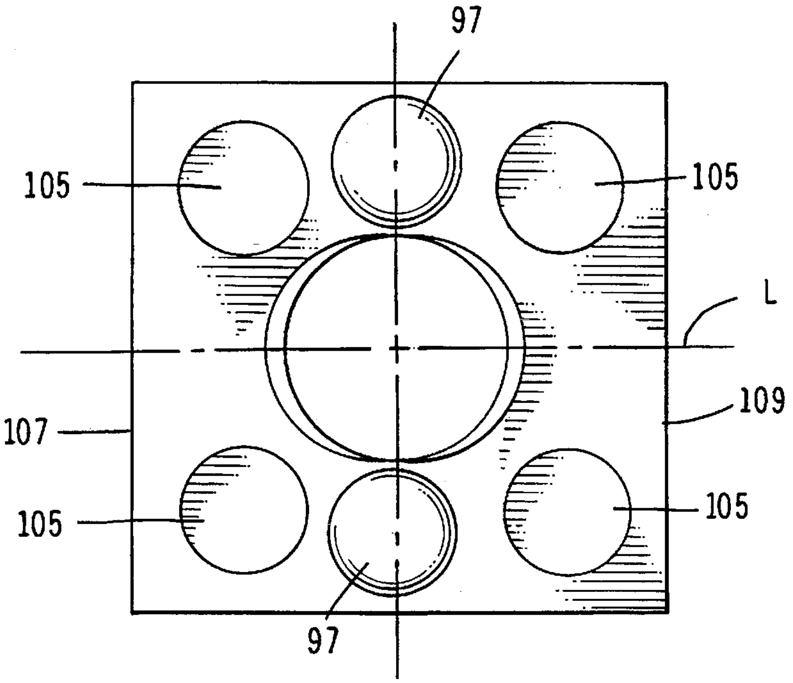
FIG. 23 is a top plan view of the washer shown in FIG. 22.
Figure 24:
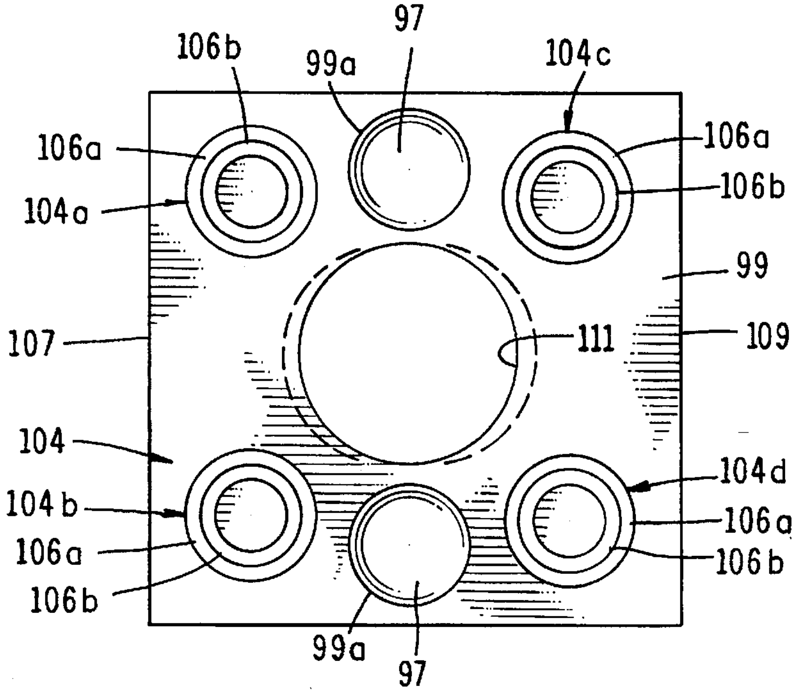
FIG. 24 is a bottom plan view of the washer shown in FIG. 22.

Turning next to FIGS. 21 through 25, still another embodiment of the tilt washer of the invention is there shown. This embodiment is similar in some respects to that shown in FIGS. 1 through 4, save that gripping means extends angularly from the bottom surface of the washer. As before, the upper surface 95 of the tilt washer is provided with screw head engaging means about which the body portion of the washer can tilt relative to the head of the screw 12. The screw head engaging means here comprise a pair of transversely, spaced-apart, upstanding protuberances 97 which are disposed on either side of the longitudinal center line "L" of the body portion. Referring particularly to FIG. 24, it can be seen that each of the protuberances 97 is formed by an appropriate forming tool which is brought into pressural engagement with the lower surface 99 of the washer at a location 99*a* in a manner to deform or upset the metal acted upon by the forming tool into a generally hemispherical shape of the character shown in FIG. 22 of the drawings.

Figure 21:
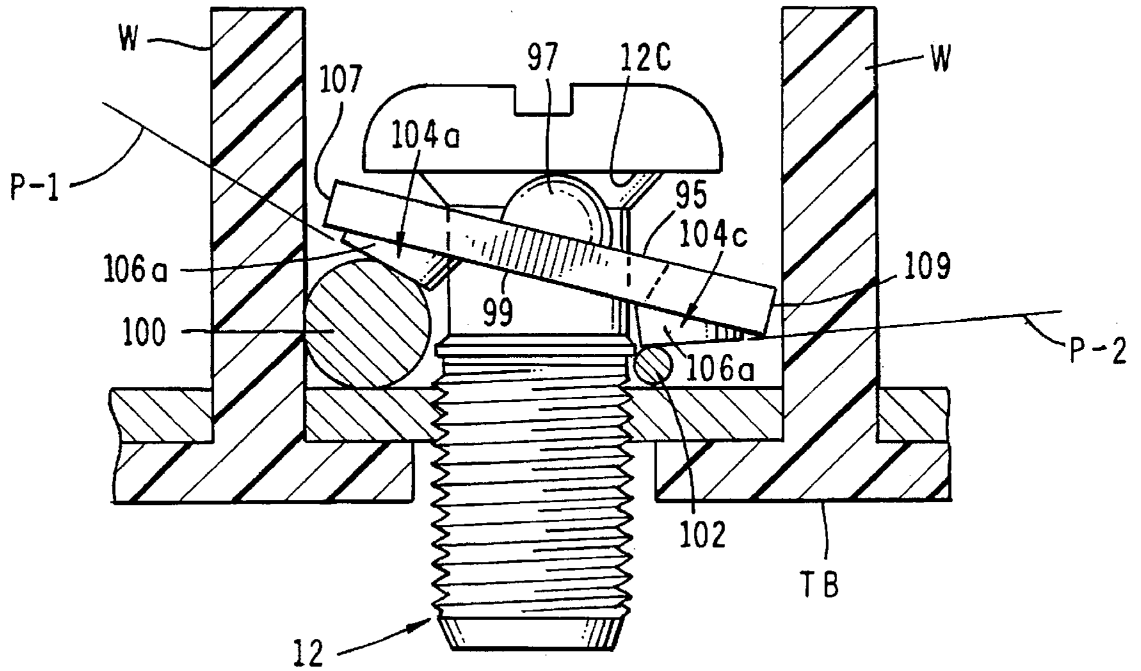
FIG. 21 is a side-elevation, partial cross-sectional view illustrating still another embodiment of the connector assembly construction of the present invention. In this form of the invention, the conductor engaging protuberances extend angularly from the lower surface of the base.

Provided on the lower surface 99 of the gripping plate, or washer body, is the previously mentioned, specially configured gripping means for positively gripping the wire conductors 100 and 102. In the form of the invention shown in FIGS. 21 through 25, the gripping means comprise four spaced-apart, gripping protuberances 104, each of which is provided with a generally circular shaped, upstanding gripping ridge 106*a*. As best seen in FIGS. 21 and 22, each of the gripping ridges terminates in a relatively sharp edge 106*b* (FIG. 22) which is adapted to bite into and securely grip the wire conductor with which it is forced into contact.

Figure 25:
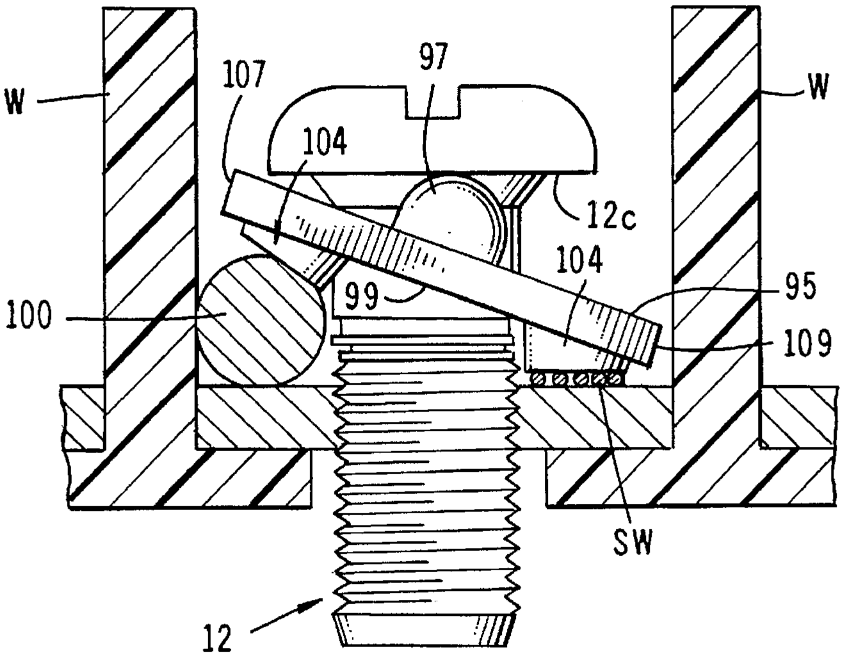
FIG. 25 is a side elevational, partial cross-sectional view illustrating the connector assembly of this form of the invention in clamping engagement with a large conductor on one side and with a flattened, strand conductor on the other side illustrating the effectiveness of the angled conductor engaging protuberances of this form of the invention.

A unique feature of this latest form of the invention resides in the fact that edges 106*b* reside in a plane which is angularly disposed relative to the plane within which the bottom surface of the washer resides. This feature is particularly beneficial when the device is used to clamp one large wire and one small wire or, as shown in FIG. 25, one large wire and one stranded wire "SW". The novel angled configuration of the gripping means insures secure engagement with even a stranded wire that has been compressed to the extent that the strands thereof are substantially coplanar. Usually this does not occur since some of strands lie across other strands. However, even in the worst case scenario shown in FIG. 25, the angled gripping means functions in a superior manner to grip the substantially deformed stranded wire.

Ridges 106*a* can have a small radius on the tip as well as a sharp edge and can be formed by various methods well known to those skilled in the art, but preferably are formed by a coining process which deforms the upper and lower surfaces of the washer in the manner illustrated in FIGS. 11 and 23. (Note circular depressions 105 formed in surface 99 during the coining step.) While various arrangements of wire-engaging gripping protuberances can be formed on the lower surface of the washer, the construction illustrated in the drawings is preferred. In this arrangement, two pair of protuberances are provided on the second surface of the washer, one pair being disposed on one side of the longitudinally extending center line of the washer body and the other pair being disposed on the opposite side of the longitudinally center line. As indicated in FIGS. 21 and 24, protuberances identified as 104*a* and 104*b* reside in a plane P-1 which extends angularly downwardly from edge 107 of the Washer body, while protuberances 104*c* and 104*d* reside in a plane P-2 which extends angularly downwardly from edge 109 of the washer body (FIG. 21).

Manufacture of the electrical connector assembly of the form of the invention shown in FIGS. 21 through 25, is accomplished in substantially the same manner as that described in connection with the embodiment of FIGS. 1 and 2. However, the gripping protuberances of this latest form of the invention, can be formed by a coining tool machined at an angle with respect to the plane of the upper surface of the washer body. Such coining process is well understood by those skilled in the art.

As before, due to the unique configuration of central aperture 111, during tightening, the washer is free to tilt or tip relative to the screw. More particularly, when, during tightening of the screw, the head engaging means, or dome members 97, are forced into engagement with the undersurface 12*c* of the screw head, the washer remains free to tilt relative to the screw as the members move relative to the undersurface 12*c* of the screw head (see FIG. 21). In this regard, it is to be noted that the washer is free to tilt from a first position, wherein the bottom surface of the washer is generally perpendicular to the longitudinal axis of the screw, to a second position wherein the gripping means engage the conductors. When the washer is in the first position, the article-engaging ridges 105 of the gripping protuberances reside within planes that extend at an acute angle with respect to the longitudinal axis of the screw. With this construction, as the screw is tightened relative to the terminal block "TB", the screw head engaging means, or protuberances 97, move into engagement with the undersurface 12*c* of the screw head and the article gripping ridges of one pair of gripping means move into engagement with the larger diameter electrical conductor 100. Continued tightening of the screw will cause the washer to tilt or pivot relative to undersurface 12*c* of the screw head in the manner shown in FIG. 21. As the washer tilts toward this second position, the article engaging ridges of the second pair of gripping protuberances move into gripping engagement with the smaller diameter electrical conductor 102. A continued tightening of the screw will then cause the washer to bite into and securely grip both the larger diameter and smaller diameter electrical conductors. As before, the terminal block includes upstanding walls "W" for preventing rotation of the washer as the screw is rotated.

Figure 26:
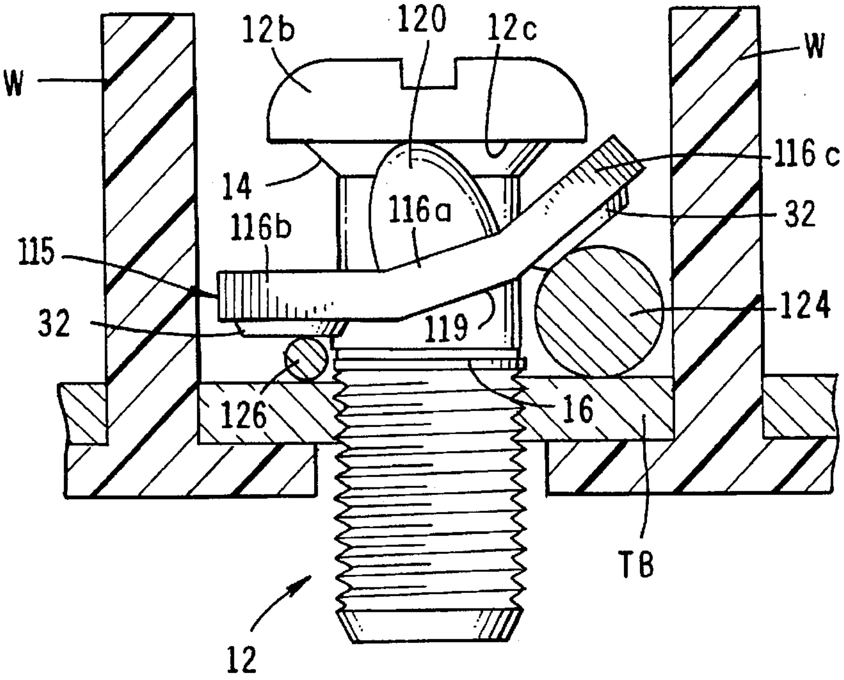
FIG. 26 is a side-elevational, partial cross-sectional view of yet another form of the connector assembly of the invention. In this form of the invention, the washer comprises a central Portion and two angularly extending wing-like sections which are coined to form the conductor engaging protuberances.
Figure 27:
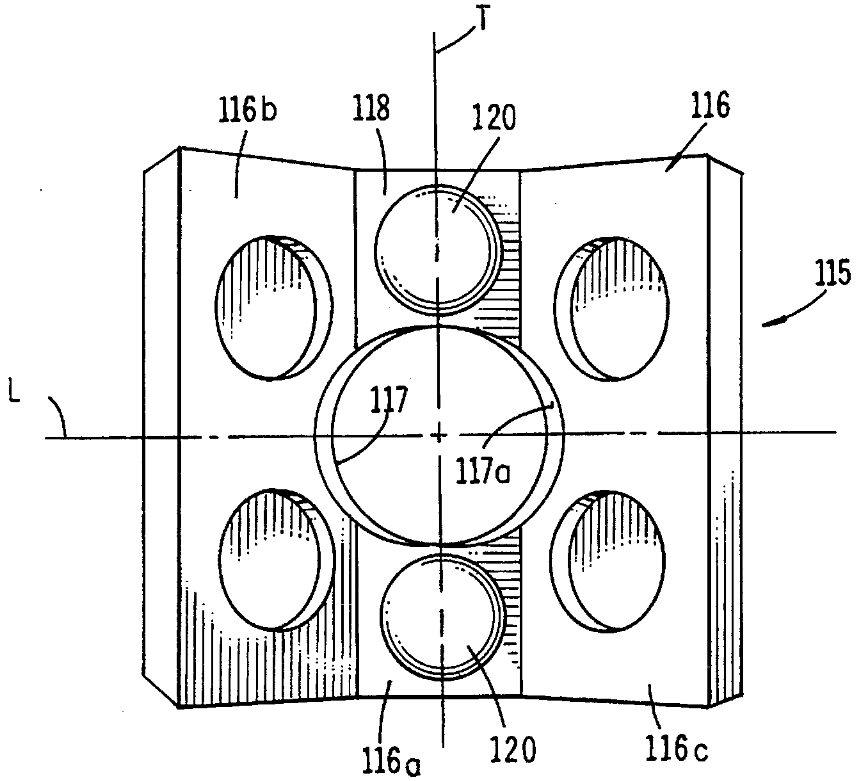
FIG. 27 is a top plan view of the washer portion of the construction shown in FIG. 26.
Figure 28:
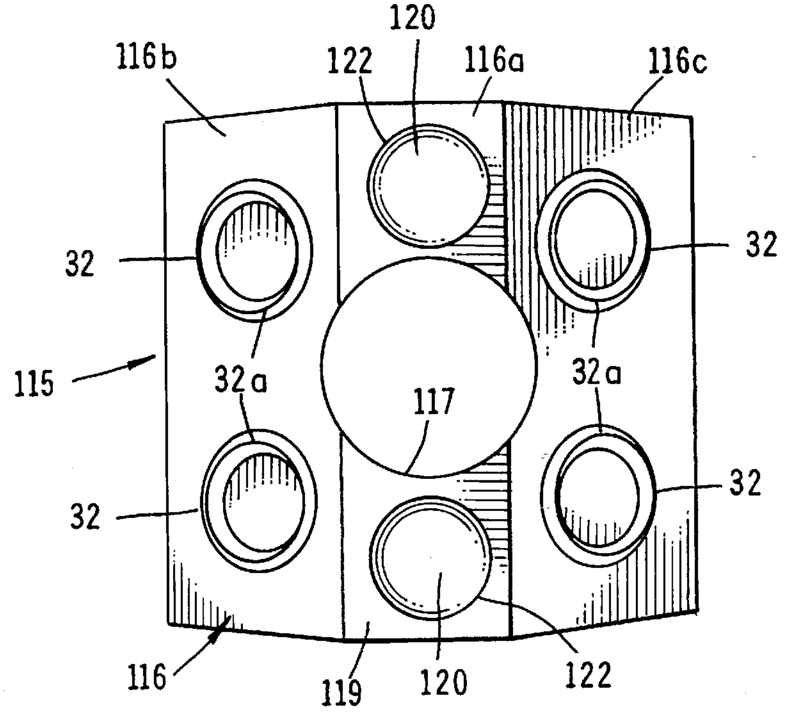
FIG. 28 is a bottom plan view of the washer construction shown in FIG. 26.

Referring next to FIGS. 26 through 28, another form of the electrical connector assembly of the present invention is there illustrated. This form of the invention is similar in many respects to that shown in FIGS. 1 through 7 and like numbers have been used to identify like elements. For example, this embodiment of the invention also includes a threaded member or screw 12 having the same general configuration previously described.

Disposed between collar 16 and chamfer 14 of the screw is wire clamping means shown here as a clamping plate or tilt washer 115 which is of slightly different construction than those previously described. More particularly, as best seen by referring to FIG. 27, washer 115 has a transversely extending center line "T" and a longitudinally extending center line "L" and includes a body portion 116 having a centrally disposed aperture 117. Aperture 117 is provided with a sloping side wall 117*a* that interconnects the upper and lower surfaces of the washer.

Turning particularly to FIGS. 26 and 27, the washer body 116 uniquely includes a central portion 116*a* having a surface defining a central plane and two integrally formed, wing-like portions 116*b* and 116*c* wing-like portion 116*b* includes a surface that defines a left-side plane that extends angularly with respect to the central plane and upwardly from the left margin of central portion 116*a*, while wing-like portion 116*c* includes a surface that defines a right-side plane which extends angularly relative to the central plane and upwardly from the right margin of central portion 116*a* as viewed in FIG. 26. Upper surface 118 of the central portion 116*a* of the tilt washer is provided with screw head engaging means of a slightly different configuration from those previously described. More particularly, in this latest embodiment of the invention, the screw head engaging means comprises a pair of transversely, spaced-apart, domed shaped protuberances 120 which are disposed on either side of longitudinal center line "L" of the washer. As before, protuberances 120 can be formed by an appropriate forming tool which is brought into pressural engagement with the lower surface of the washer at locations 122 (FIG. 28) in a manner well known to those skilled in the art to form the protuberances into the configuration shown in the drawings.

Provided on the lower surface, each of the wing portions 116*b* and 116*c* of the gripping plate, or washer body, is gripping means for gripping the wire conductors 124 and 126. These gripping means are of identical construction to those shown in FIGS. 1 through 7 and comprise a plurality of spaced-apart gripping members 32 having gripping ridges 32*a*.

As in the previously described embodiment of the invention, washer 115 is held captive between annular collar 16 and the undersurface 12*c* of the screw head 12*b* and, because of the configuration of the central aperture, is free to tip or tilt relative to the screw in the manner shown in (FIG. 26). With the conductor wires 124 and 126 inserted between the terminal block and the washer in the manner shown in FIG. 26 and spanning the gripping means or members 32, tightening of the terminal screw relative to the terminal block will cause the washer to tilt from a first position wherein the undersurface 119 of central portion 116*a* is generally perpendicular to the longitudinal axis of the screw to a second position wherein the gripping protuberances move into secure gripping engagement with both the large and small wire conductors. Due to the novel, angularly extending wing portions 116*b* and 116*c*, the gripping ridges of the protuberances reside in planes that extend at acute angles with respect to the longitudinal axis of the screw when the washer is in the first position. As the washer moves into the second position, the article gripping ridges securely grip the large and small wires in a similar manner to the gripping ridges of the embodiment of the invention shown in FIGS. 21 through 25. Accordingly, this latest form of the invention is also ideally secured for use with very small diameter wires and with stranded wires of the character shown in FIG. 25.

Figure 29:
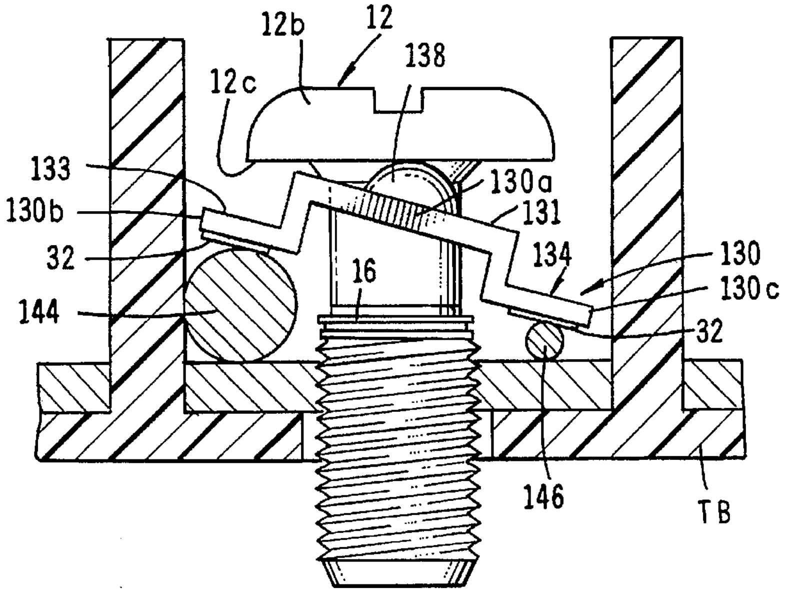
FIG. 29 is a side-elevational, partial cross-sectional view illustrating yet another form of the connector assembly construction of the invention. In this form of the invention, the washer is provided with an elevated central portion with the conductor engaging protuberances being coined on two longitudinally spaced-apart, wing-like segments.
Figure 30:
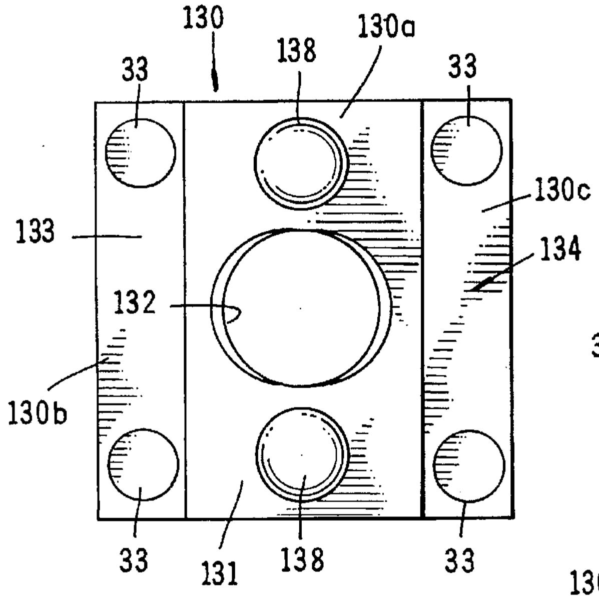
FIG. 30 is a top plan view of the washer shown in FIG. 29.
Figure 31:
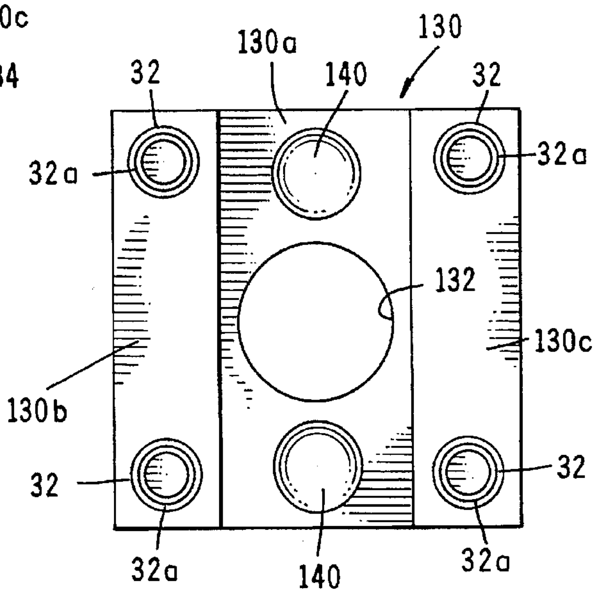
FIG. 31 is a bottom plan view of the washer shown in FIG. 29.

Referring to FIGS. 29 through 31, another form of the electrical connector assembly of the present invention is there illustrated. This form of the invention is also somewhat similar to that shown in FIGS. 1 through 7 save that the central portion 130*a* of the washer body 130 is raised to permit the use of screw-head engaging means of a lesser height. This embodiment of the invention also includes a threaded member or screw 12 having the same general configuration previously described. As shown in FIGS. 30 and 31, central portion 130*a* of the washer body is provided with an aperture 132 that receives screw 12.

As best seen in FIG. 29, the central portion 130*a* of the washer has a surface 131 that defined a central plane. Disposed on either side of portion 130*a* are two integrally formed, wing-like portions 130*b* and 130*c*. Wing-like portion 130*b* includes a surface 133 that defines a left-side plane that is vertically spaced apart from, but generally parallel to, the plane of surface 131. Similarly, wing-like portion 130*c* includes a surface 134 that defines a right-side plane which is vertically spaced apart from, but generally parallel to the plane of surface 131. In this form of the invention, surfaces 133 and 134 are substantially coplanar. As before, the tilt washer is provided with screw head engaging means of the same character as that described in connection with the embodiment of FIGS. 21 through 24. More particularly, the screw head engaging means comprise protuberances 138 which can be formed by an appropriate forming tool which is brought into pressural engagement with the lower surface of the washer at locations 140 (FIG. 31).

Provided on the lower surface, each of the wing portions 130*b* and 130*c* of the gripping plate, or washer body is gripping means for gripping the wire conductors 144 and 146. These gripping means are of identical construction to those shown in FIGS. 1 through 7 and comprise a plurality of spaced-apart gripping members 32 having gripping ridges 32*a* which are preferably formed by a coining technique.

As in the previously described embodiment of the invention, washer 130 is held captive between annular collar 16 and the undersurface 12*c* of the screw head 12*b* and, because of the configuration of the central aperture, is free to tip or tilt relative to the screw in the manner shown in FIG. 29.

Figure 29A:
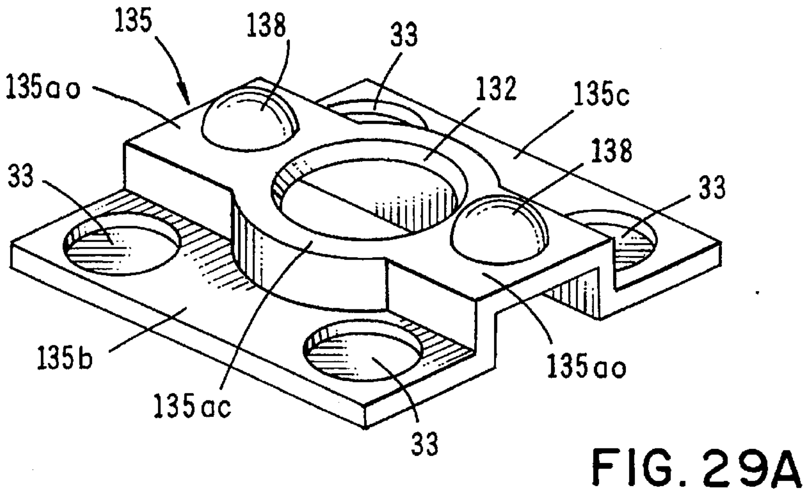
FIG. 29A is a generally perspective view of another form of tilt washer construction of the invention.
Figure 31A:
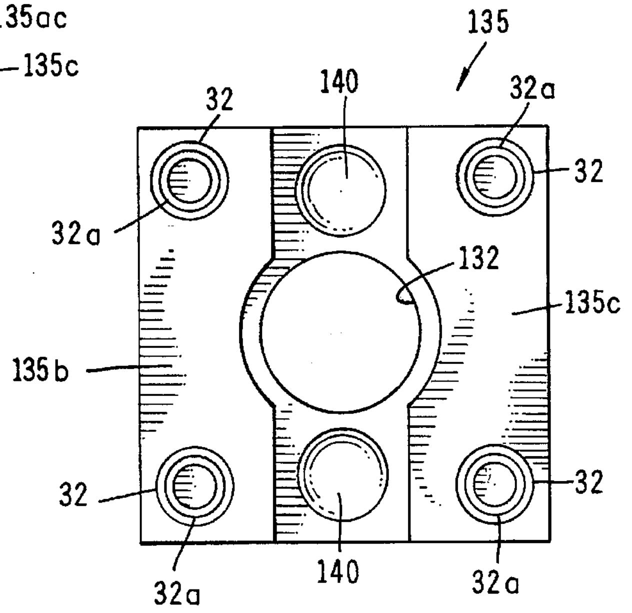
FIG. 31A is a bottom plan view of the washer shown in FIG. 29A.
Figure 29B:
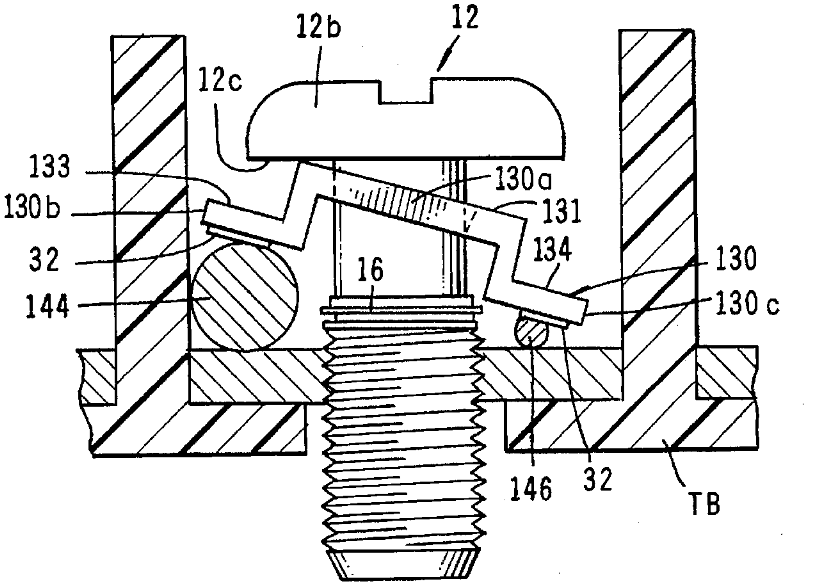
FIG. 29B is a side-elevational, partial cross-sectional view illustrating yet another form of the connector assembly construction of the invention.
Figure 31B:
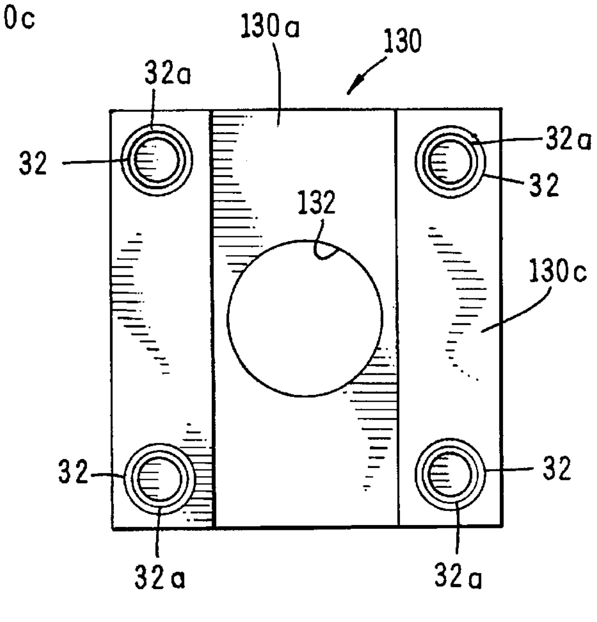
FIG. 31B is a bottom plan view of the washer shown in FIG. 29B.
Figure 29C:
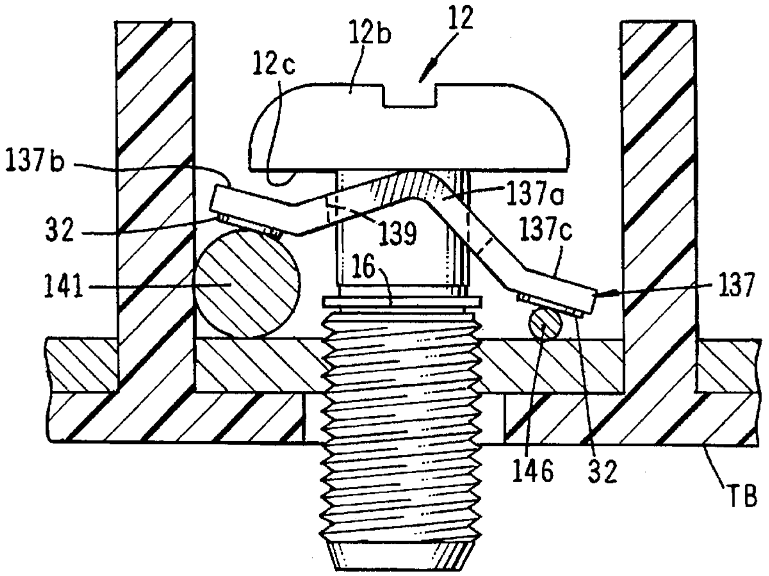
FIG. 29C is a side-elevational, partial cross-sectional view illustrating still another form of the connector assembly construction of the invention.

Referring to FIGS. 29A through 31A, another form of the electrical connector assembly of the present invention is there illustrated. This form of the invention is somewhat similar in construction to that shown in FIGS. 29 through 31 save that the outboard ends 135*ao* of the washer 135 are of a reduced width so that the gripping means, or gripping members 32 formed on wing portions 135*b* and 135*c* can be made slightly larger for a greater area of wire contact. In this embodiment of the invention, the center portion 135*ac* is generally circular in plan and the protuberances 138 are formed on the outboard ends 135*ao* as best seen in FIG. 29A. Since the device shown in FIGS. 29A through 31A operate in the same manner as previously described, further description of this latest embodiment is not believed necessary.

Referring to FIGS. 29B through 31B, another form of the electrical connector assembly of the present invention is there illustrated. This form of the invention is virtually identical in construction to that shown in FIGS. 29 through 31 save that the screw head engaging protuberances 138 have been removed. In this embodiment of the invention, the center portion 130*a* itself guarantees that the screw head engagement be inside the center line of the large wire 144. Since the same numerals are used in FIGS. 29A through 31A to identify like components as shown in FIGS. 29 through 31, further description of this latest embodiment is not believed necessary.

Figure 30A:
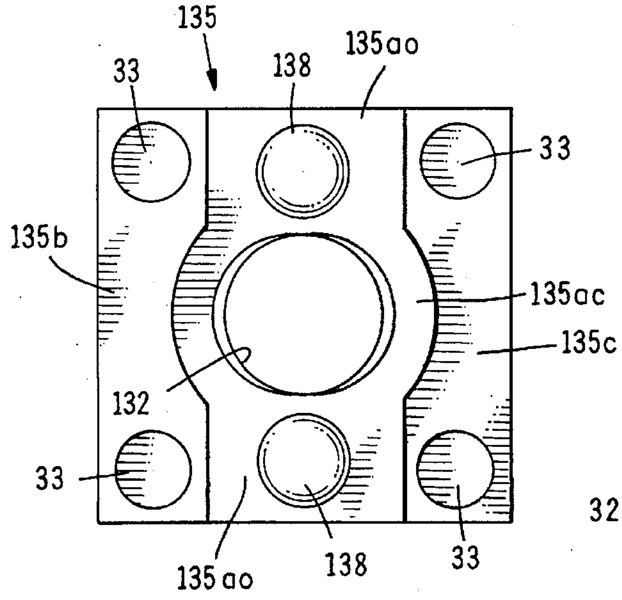
FIG. 30A is a top plan view of the washer shown in FIG. 29A.
Figure 30B:
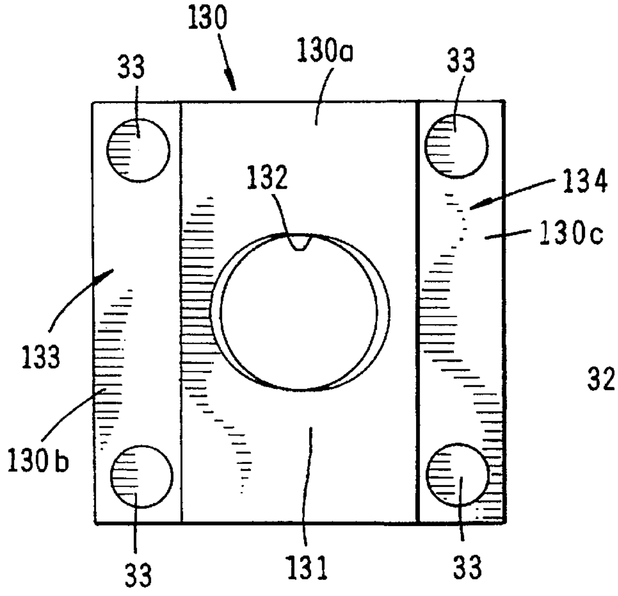
FIG. 30B is a bottom plan view of the washer shown in FIG. 29B.
Figure 30C:
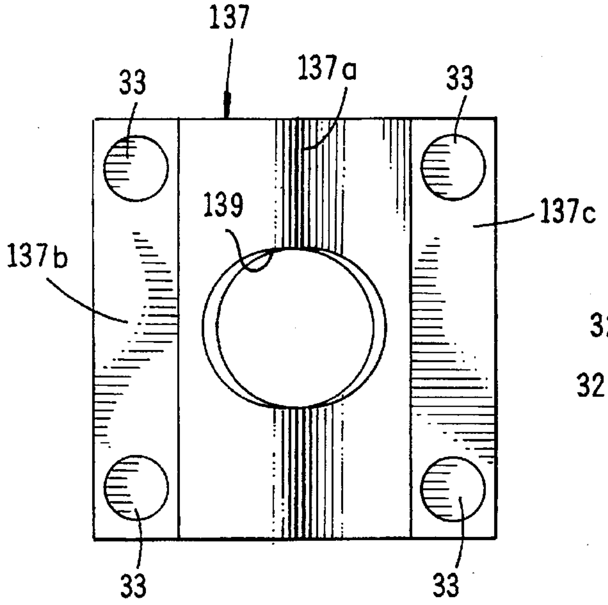
FIG. 30C is a top plan view of the washer shown in FIG. 29C.
Figure 31C:
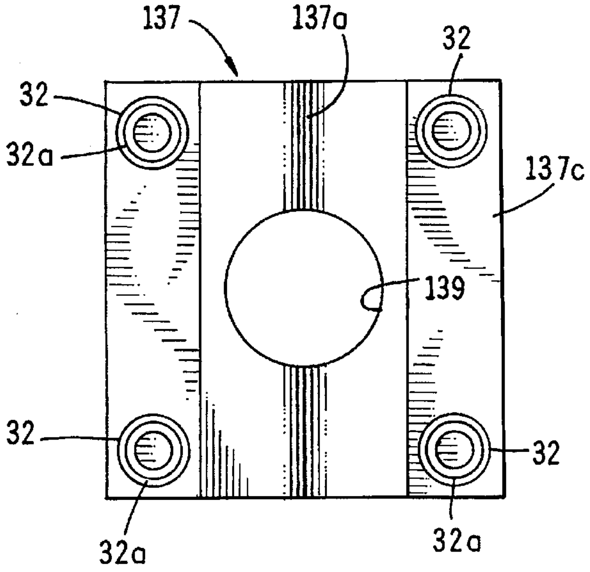
FIG. 31C is a bottom plan view of the washer shown in FIG. 29C.

Referring next to FIGS. 29C through 31C still another form of the electrical connector assembly of the present invention is there illustrated. This form of the invention is very similar to that shown in FIGS. 29B through 31B in that in this construction the screw head engaging protuberances 138 have also been removed. However, in this latest embodiment of the invention, the center portion 137*a* of the washer body 137 is generally "V" shaped in cross section with the apex thereof engageable with the lower surface 12*c* of the screw head in the manner shown in FIGS. 29C. This embodiment of the invention also includes a threaded member or screw 12 having the same general configuration previously described. As shown in FIGS. 30C and 31C, central portion 137*a* of the washer body is provided with an aperture 139 that receives screw 12. Disposed on either side of portion 137*a* are two integrally formed, wing-like portions 137*b* and 137*c*. Provided on the lower surface, each of the wing portions 137*b* and 137*c* of the gripping plate, or Washer body is gripping means for gripping the wire conductors 144 and 146. These gripping means are of identical construction to those shown in FIGS. 1 through 7 and comprise a plurality of spaced-apart gripping members 32 having gripping ridges 32*a* which are preferably formed by a coining technique.

As in the previously described embodiment of the invention, washer 137 is held captive between annular collar 16 and the undersurface 12*c* of the screw head 12*b* and, because of the configuration of the central aperture, is free to tilt relative to screw 12.

Figure 32:
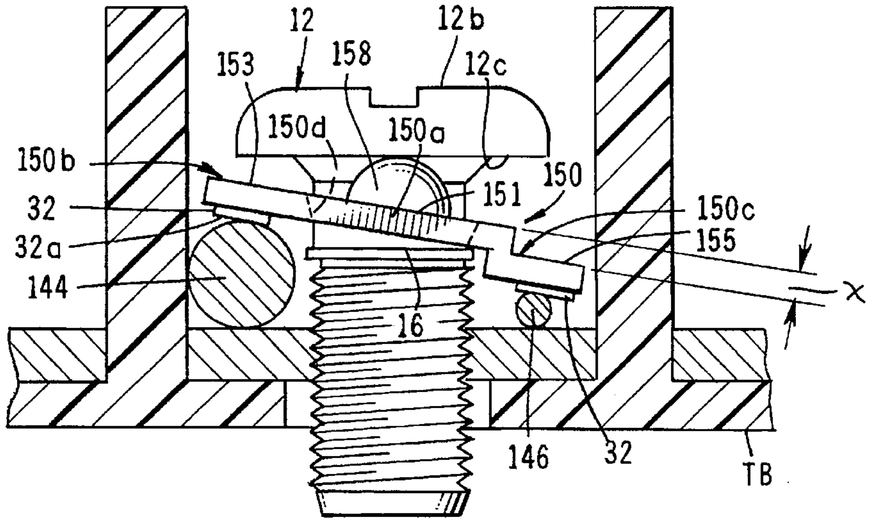
FIG. 32 is a side-elevational, partial cross-sectional view of still another embodiment of the connector assembly construction of the present invention.
Figure 33:
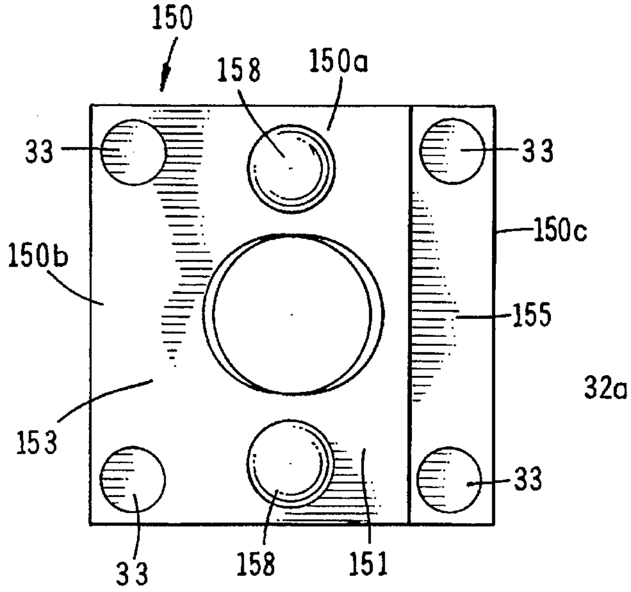
FIG. 33 is a top plan view of the washer portion of the construction shown in FIG. 32.
Figure 34:
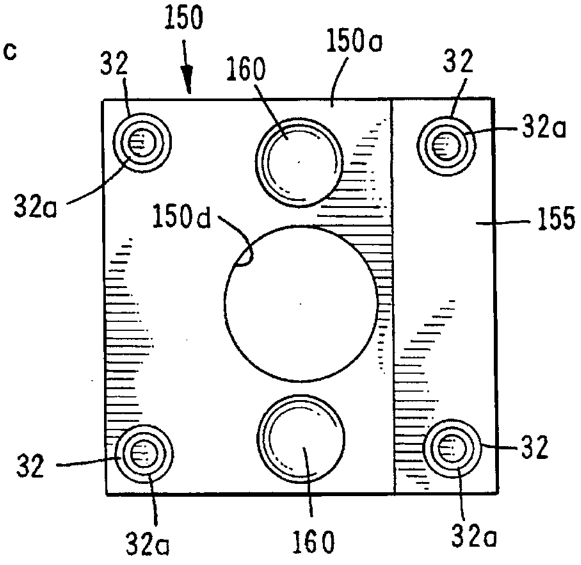
FIG. 34 is a bottom plan view of the washer construction shown in FIG. 32.

Referring next to FIGS. 32 through 34, still another form of the electrical connector assembly of the present invention is there illustrated. This form of the invention is similar in many respects to that just described and like numbers have been used to identify like elements. This embodiment of the invention also includes an apertured washer or gripping plate 150. As best seen in FIG. 32 the central portion 150*a* of the washer 150 has a surface 151 that defines a central plane. Disposed on either side of portion 150*a* are two integrally formed, side portions 150*b* and 150*c*. Portion 150*b* includes a surface 153 that defines a left-side plane that is substantially coplanar with the plane of surface 151. Portion 150*c*, on the other hand, includes a surface 155 that defines a right-side plane which is vertically spaced apart from surface 151 by a distance X and one which is generally parallel to the plane of surface 151. It is to be noted that with this construction, the smaller diameter wire 146 must be placed below portion 155. It is also to be noted that the distance X is optimal for this design and preferably is about one-half the difference between the diameters of the largest and smallest wires to be accommodated.

As before, the tilt washer is provided with screw head engaging means of the same character as that described in connection with the embodiment of FIGS. 21 through 24. More particularly, the screw head engaging means comprise protuberances 158 which can be formed by an appropriate forming tool which is brought into pressural engagement with the lower surface of the washer at locations 160 (FIG. 34). As before, due to the offset construction, the height of the protuberances 158 can be less.

Provided on the lower surface, each of the side portions 150*b* and 150*c* of the gripping plate, or washer body, is gripping means for gripping the wire conductors 144 and 146. These gripping means are of identical construction to those shown in FIGS. 1 through 7 and comprise a plurality of spaced-apart gripping members 32 having gripping ridges 32*a* which are preferably formed by a coining technique.

As in the previously described embodiment of the invention, washer 150 is held captive between annular collar 16 and the undersurface 12*c* of the screw head 12*b* and, because of the configuration of the central aperture 150*d*, is free to tip or tilt relative to the screw in the manner shown in FIG. 32.

Figure 35:
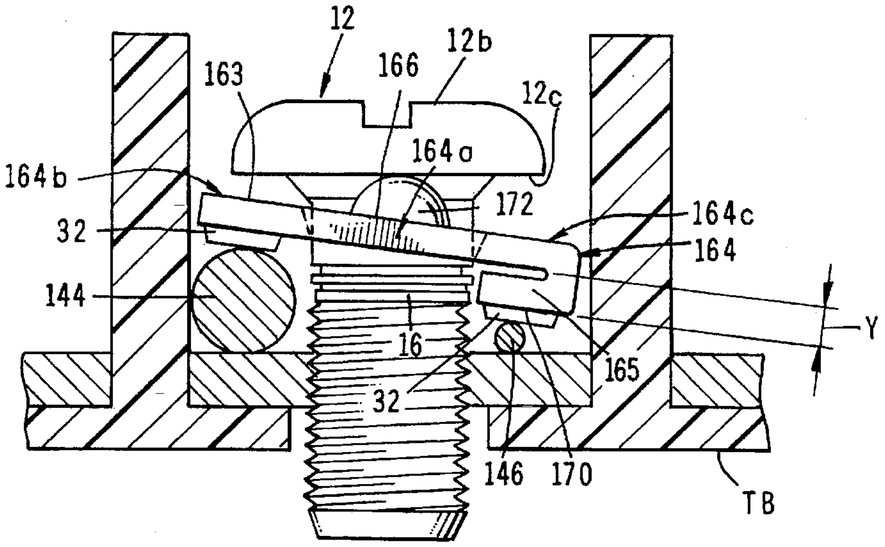
FIG. 35 is a side-elevational, partial cross-sectional view illustrating still another form of the connector assembly of construction of the invention.
Figure 36:
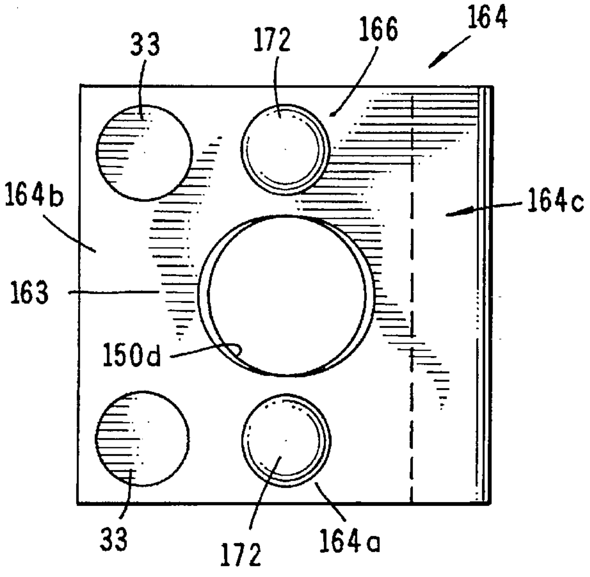
FIG. 36 is a top plan view of the washer portion of the construction shown in FIG. 35.
Figure 37:
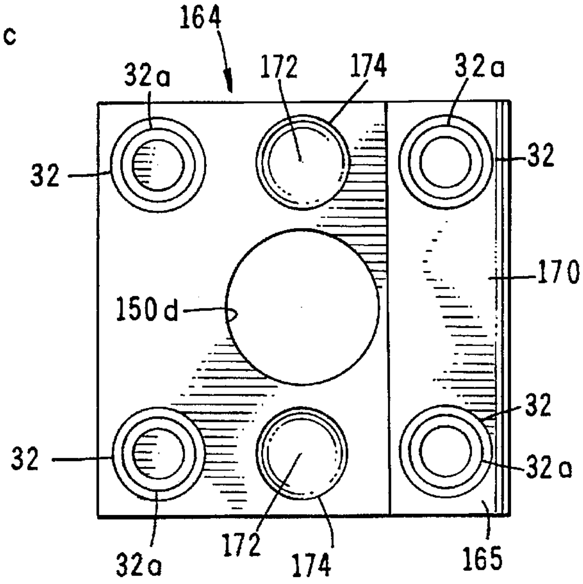
FIG. 37 is a bottom plan view of the washer construction shown in FIG. 35.

Referring next to FIGS. 35 through 37, another embodiment of the electrical connector assembly of the present invention is there shown. This form of the invention is similar in many respects to that just described and like number have been used to identify like elements. This embodiment of the invention also includes an apertured washer or gripping plate 164. As best seen in FIG. 35 the central portion 164*a* of the washer 164 has a surface 166 that defines a central plane. Disposed on either side of portion 164*a* are two integrally formed, side portions 164*b* and 164*c*. Portion 164*b* includes a surface 163 that defines a left-side plane that is substantially coplanar with the plane of surface 166. Portion 164*c*, on the other hand, includes a surface 170 that is formed by a bent-over segment 165 that comprises a part of portion 164*c* and is disposed below the plane of the washer in the manner shown in FIG. 35. Surface 170 defines a lower, right-side plane which is vertically spaced apart from surface 166 by a distance Y and one which is generally parallel to the plane of surface 166. Optimally, distance "Y" is about one-half of the difference between the diameters of wires 144 and 146.

Once again, the tilt washer is provided with screw head engaging means of the same character as that described in connection with the embodiment of FIGS. 21 through 24. More particularly, the screw head engaging means comprise protuberances 172 which can be formed by an appropriate forming tool which is brought into pressural engagement with the lower surface of the washer at locations 174 (FIG. 37).

Provided on the lower surface portions 164*b* and on surface 170, are gripping means for gripping the wire conductors 144 and 146. These gripping means are of identical construction to those shown in FIGS. 1 through 7 and comprise a plurality of spaced-apart gripping members 32 having gripping ridges 32*a* which are preferably formed by a coining technique of the character previously described.

As in the previously described embodiment of the invention, washer 164 is held captive between annular collar 16 and the undersurface 12*c* of the screw head 12*b* and, because of the configuration of the central aperture, is free to tip or tilt relative to the screw in the manner shown in FIG. 35.

Figure 38:
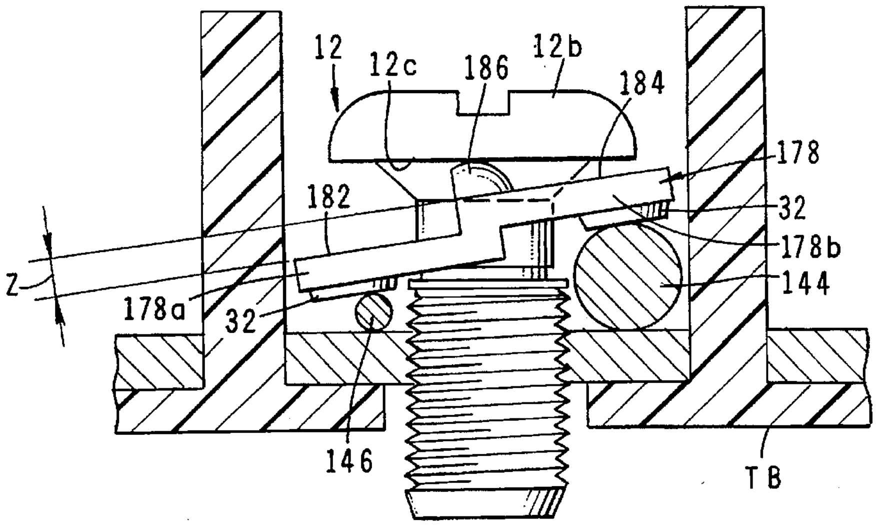
FIG. 38 is a side-elevational, partial cross-sectional view illustrating yet another embodiment of the connector assembly construction of the invention.
Figure 39:
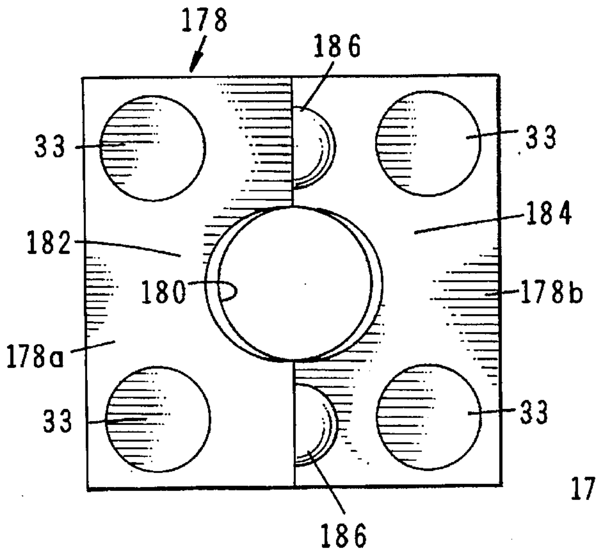
FIG. 39 is a top plan view of the washer portion of the construction shown in FIG. 38.
Figure 40:
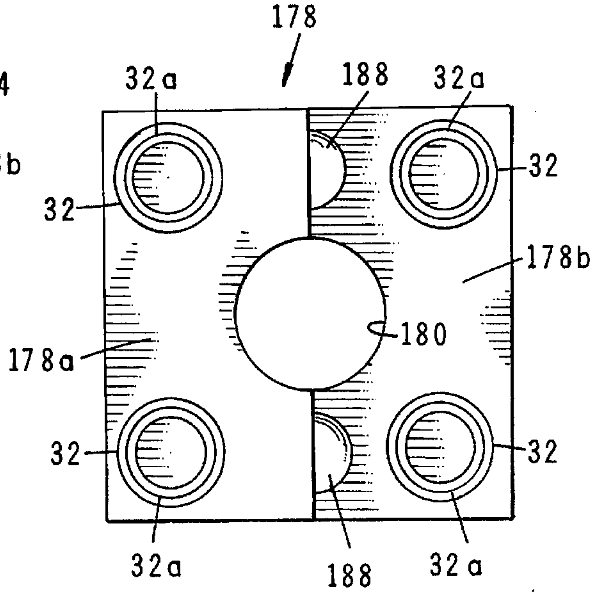
FIG. 40 is a bottom plan view of the washer portion of the connector assembly shown in FIG. 38.

Turning to FIGS. 38 through 40, another form of the electrical connector assembly of the present invention is there illustrated. This form of the invention is also similar in many respects to that just described and like number have been used to identify like elements. This embodiment of the invention includes a novel offset washer or gripping plate 178 having a central aperture 180. As best seen in FIG. 38, washer 178 comprises first and second wing like portions 178*a* and 178*b*. Portion 178*a* includes a planar surface 182, while portion 178*b* includes a planar surface 184 that is generally parallel to, but spaced apart from surface 182 by a distance Z. Once again, distance Z is about one-half the difference between the diameter of wires 144 and 146. Tilt washer 178 also is provided with screw head engaging means. However, the screw head engaging means are here of a character generally similar to that described in connection with the embodiment of FIGS. 8 through 14. More particularly, the screw head engaging means comprise lanced-out protuberances 186 which can be formed by an appropriate forming tool which is brought into pressural engagement with the lower surface of the washer at locations 188 (FIG. 40).

Provided on the lower surface, each of the side portions 178*a* and 178*b* of the gripping plate, or washer body, is gripping means for gripping the wire conductors 144 and 146. These gripping means are of identical construction to those shown in FIGS. 1 through 7 and comprise a plurality of spaced-apart gripping members 32 having gripping ridges 32*a* which are preferably formed by a coining technique.

As in the previously described embodiment of the invention, washer is held captive relative to the screw 12 and is free to tip or tilt relative thereto in the manner shown in FIG. 38.

Figure 41:
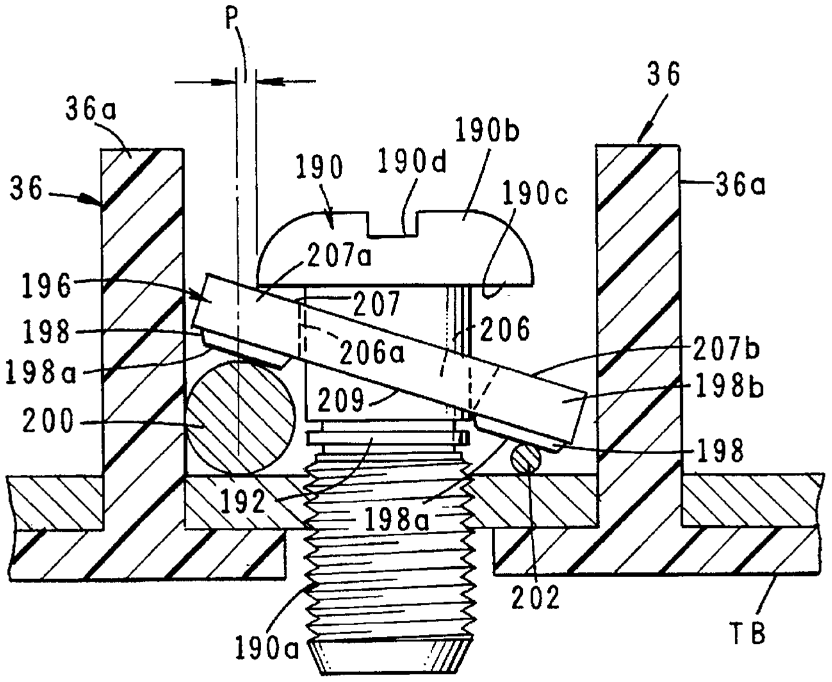
FIG. 41 is a side-elevational, partial cross-sectional view illustrating another embodiment of the connector assembly of the construction of the invention.
Figure 42:
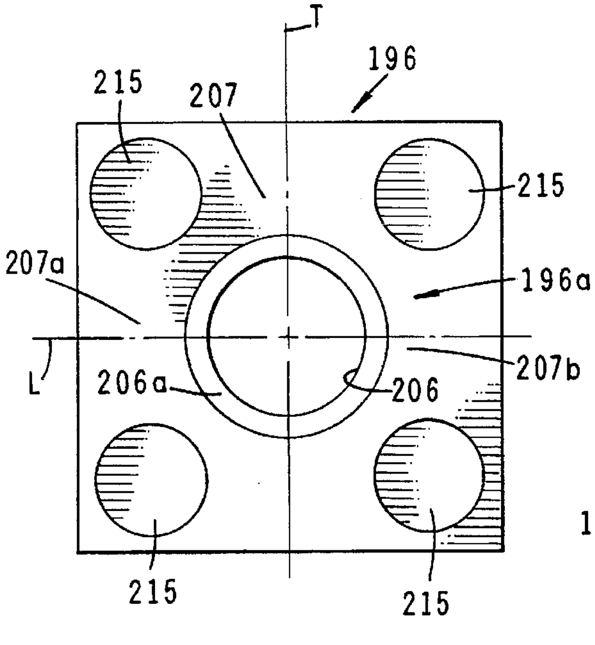
FIG. 42 is a top plan view of the washer portion of the construction shown in FIG. 41.

Turning to FIGS. 41 through 46 and particularly to FIGS. 41 and 42, still another form of the electrical connector assembly of the invention is there illustrated. This embodiment of the invention is somewhat similar to that shown in FIGS. 1 through 7 and also comprises a threaded member such as a screw 190 having a shank portion 190*a* and ahead portion 190*b*. Head portion 190*b* has a generally flat, annular-shaped undersurface 190*c* and is provided with a tool-engaging slot 190*d*. However, unlike screw 12, screw 190 does not have a chamfer formed intermediate surface 190*c* and shank portion 190*a*. As in screw 12, an annular-shaped collar 192 is formed on shank 190*a* to secure the washer 196 in position relative to the screw head.

Figure 44:
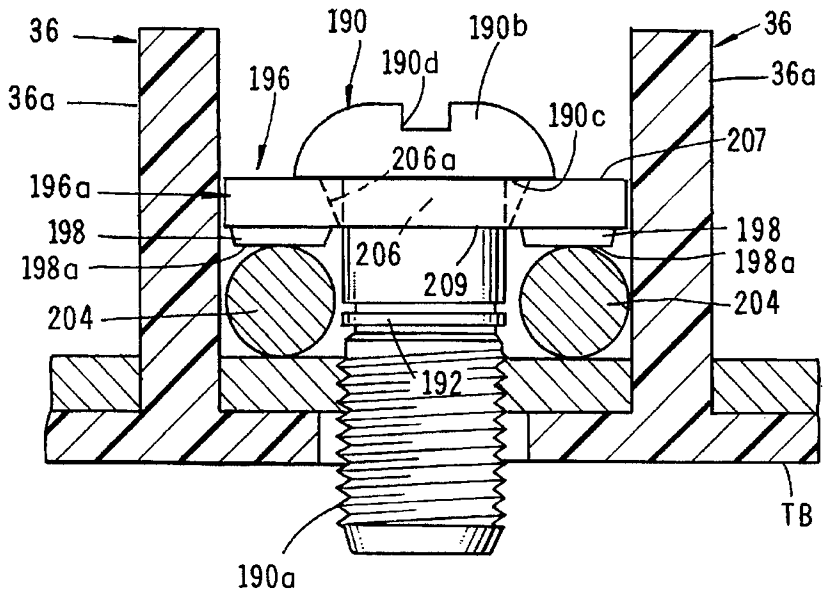
FIG. 44 is a side-elevational, partial cross-sectional view illustrating the use of the connector assembly shown in FIG. 41 with two wires of the same size.
Figure 45:
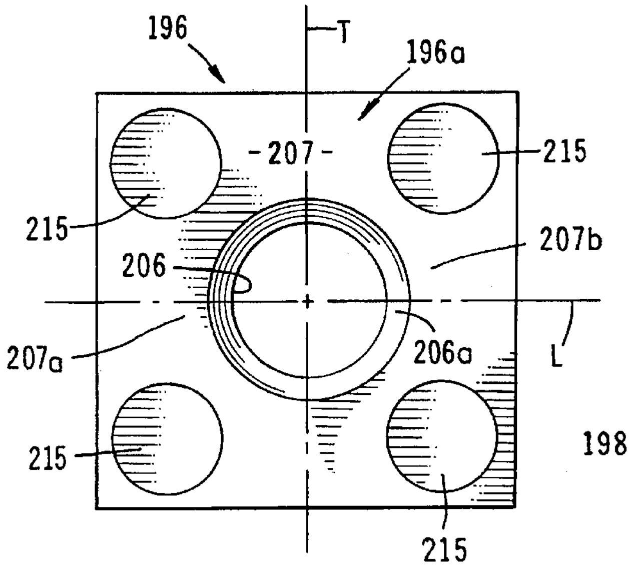
FIG. 45 is a top plan view of the washer portion of the construction shown in FIG. 44.
Figure 46:
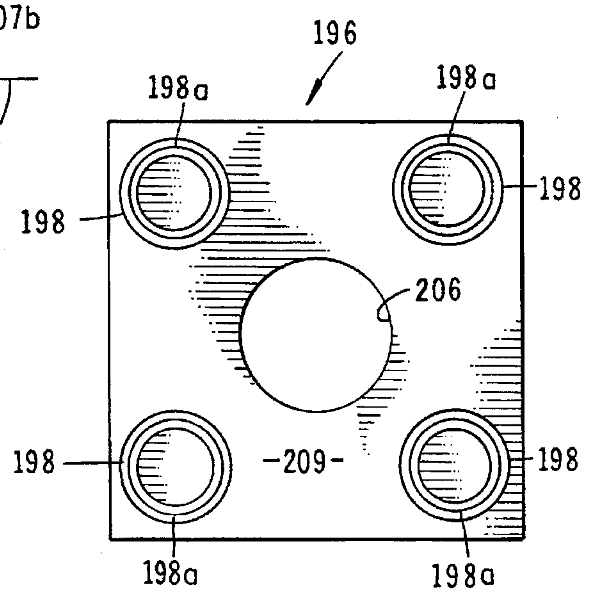
FIG. 46 is a bottom plan view of the washer portion of the construction shown in FIG. 44.

Washer, or clamping plate 196, is similar to the washers described previously and includes gripping protuberances 198 which function to securely clamp electrical conductors or wires of the same or differing diameters. In FIG. 41, the conductors are shown as a large-diameter, solid-wire conductor 200 and a small- diameter, solid-wire conductor 202. In FIG. 44, on the other hand, the conductors are shown as two solid wires 204 of the same diameter.

As before, washer 196 has a transversely extending center line "T" and a longitudinally extending center line "L" (FIG. 45) and includes a body 196*a* having a central portion defining a central plane and being provided with a centrally disposed aperture 206. As indicated in FIG. 44, aperture 206 is provided with a sloping side wall 206*a* that interconnects the upper and lower surfaces of the washer designated in FIG. 44 by the numerals 207 and 209 respectively. At both the upper and lower surfaces of the washer, aperture 206 is generally circular in shape with the upper circle being larger in diameter. With this construction, the washer can tilt freely about the upper portion of shank 190*a*.

Unlike the embodiment of the invention shown in FIGS. 1 and 4, the upper surface 207 of tilt washer 196 is generally planer and, in this case, portions of the upper surface itself form the screw head engaging means about which the body portion of the washer can tilt relative to the head of the screw 190. These surface portions which define right and left-side planes are located on either side of aperture 206 and are indicated in FIG. 41 by the numerals 207*a* and 207*b*. It is to be observed, the dimension "P" shown in FIG. 41 must be positive, that is, the center line of the larger wire 200 must be located outside the outer periphery of screw head 190*b*. Accordingly, the screw head must be somewhat smaller than the head of the previously described screws, such as screw 12. An important advantage of this latest washer design resides in the fact that it will function at any 90 degree orientation as opposed to 180 degree orientation required in the earlier described embodiments having the upstanding protuberances which form the screw head engaging means.

Provided on the lower surface 209 of the gripping plate, or washer body 196, are the previously identified gripping protuberances 198 which positively grip the wire conductors 200, 202 and 204. As in the earlier described embodiments, the gripping means here comprise four, spaced-apart, generally circular-shape gripping protuberances 198, each of which is provided with a generally circular-shaped, upstanding gripping ridge 198*a*. Gripping protuberances are formed in the same manner and function in the same way as the gripping protuberances 32 described in connection the first form of the invention shown in FIGS. 1 through 7. As before, ridges 198 can have a small radius on the tip and can be formed by various methods well known to those skilled in the art, but preferably are formed by a coining process which deforms the upper and lower surfaces of the washer in the manner illustrated in FIGS. 42 and 45. (Note circular depressions 215 formed in surface 207 during the coining step.)

Figure 43:
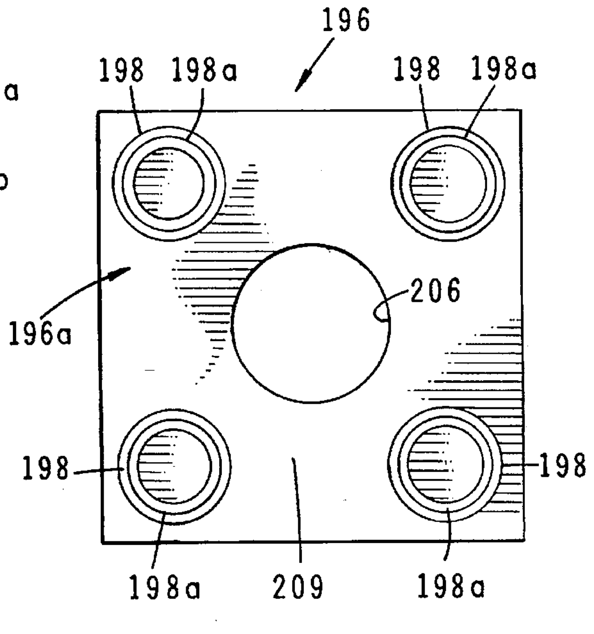
FIG. 43 is a bottom plan view of the washer portion of the connector assembly shown in FIG. 41.

With the construction illustrated in FIGS. 41 through 43, prior to tightening the screw to the terminal block TB, the conductor wires 200 and 202 are inserted between the terminal and the washer in the manner shown in the drawings so that the wires span the gripping protuberances. As the screw is tightened relative to the terminal, the screw head engaging means, or surface portion 207*a* of the washer will move into engagement with the undersurface of the screw head and one pair of gripping means move into engagement with the larger diameter electrical conductor 200. Continued tightening of the screw will cause the washer to tilt or pivot relative to the screw head in the manner shown in FIG. 41. As the washer tilts, the second pair of gripping protuberances move into gripping engagement with the smaller diameter electrical conductor 202. A continued tightening of the screw will then cause ridges 198*a* to bite into and securely grip both the larger diameter and smaller diameter electrical conductors. As before, the terminal block shown in FIG. 41 includes a plastic housing 36 which surrounds the assemblage comprising the screw 190 and the washer 196. Housing 36 includes upstanding walls 36*a* which engage the edges of the washer to prevent it from rotating during the tightening of the screw.

Figure 47:
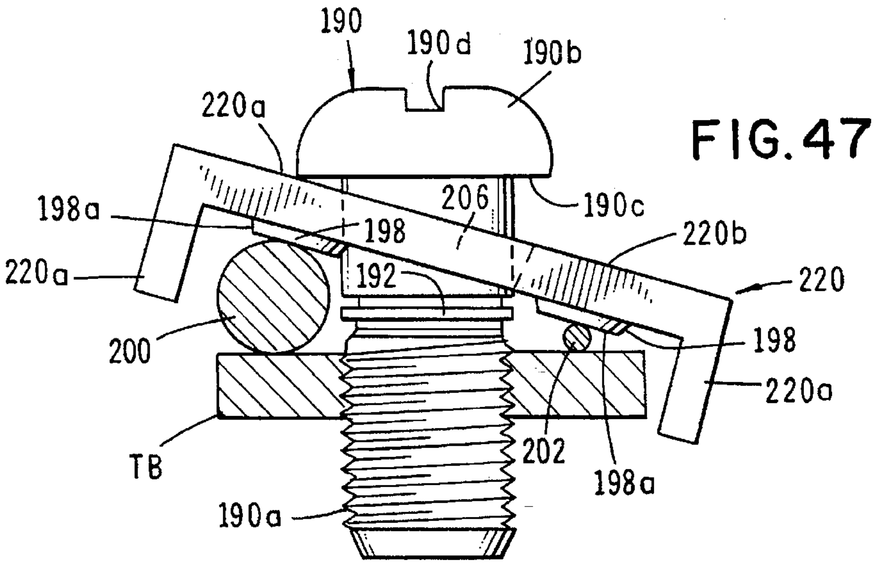
FIG. 47 is a side-elevational, partial cross-sectional view illustrating still another form of the connector assembly construction of the invention.
Figure 48:
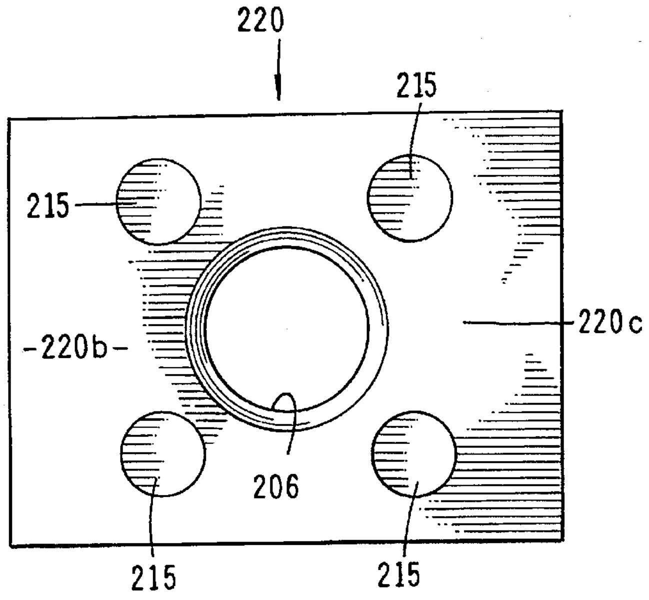
FIG. 48 is a top plan view of the washer portion of the assembly shown in FIG. 47.
Figure 49:
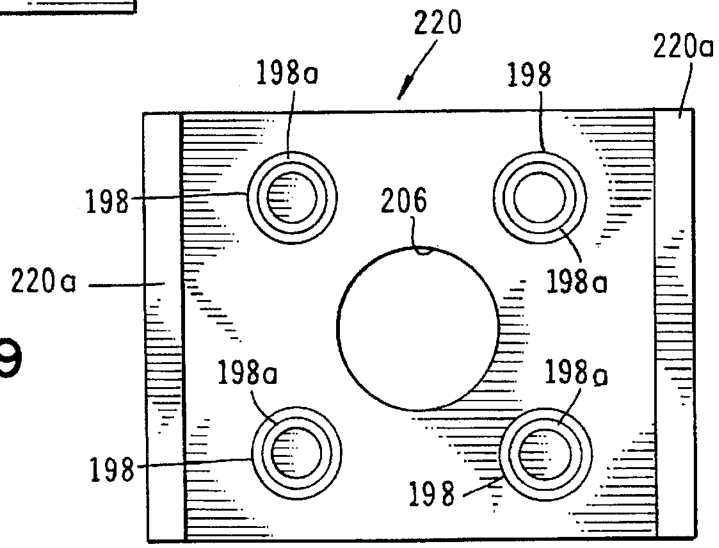
FIG. 49 is a bottom plan view of the washer portion of the construction shown in FIG. 47.

Turning next to FIGS. 47 through 49, in the form of the invention there shown, the means for blocking rotational movement of the washer comprises turned-down flanges 220*a* provided on the washer body itself. This rotation preventing means takes the place of walls 36 on the terminal block and functions equally well to block rotation of the washer 220 about the shank of the screw 190. As indicated in FIGS. 47 through 49, washer 220 is of substantially identical construction and operation to washer 196 of the previously described embodiment save that it includes the down-turned flanges 220*a*. More particularly washer 220 also includes screw head engaging means comprising surface portions 220*b* and 220*c*.

Turning to FIGS. 50 through 52, still another form of the electrical connector assembly of the present invention is there illustrated. This form of the invention is similar in many respects to that shown in FIGS. 15 through 19 in that washer 224 also includes an upstanding collar 226 which comprises the head engaging means about which the washer body can tilt. As best seen in FIG. 50, collar 226 comprises a center hole 227 provided substantially in the shape of an inverted cone having a body portion 226*a* which terminates in an upper, screw head engaging periphery 226*b*. With this novel design the device can once again function at any 90 degree orientation with peripheral portion 126*b* engaging the lower surface of the screw to cause the washer to tilt relative to the axis of the screw.

Provided on the lower surface 224*b* of the gripping plate, or washer body 224, is a gripping means for gripping wire conductors 230 and 232. These gripping means are identical to those shown in FIGS. 1 through 7 and comprise spaced-apart gripping members 32 which are generally circular In shape. Once again, gripping members 32 are formed in the same manner and function in the same way as previously described.

Referring next to FIGS. 53 through 56 and particularly to FIG. 56, still another form of the electrical connector assembly of the invention is there illustrated. This embodiment of the invention is quite similar to that shown in FIGS. 41 through 46 and comprises a threaded member such as a screw 190. Because of the similarities of this form of the invention to that shown in FIGS. 41 through 46, like numbers will be used to identify like components.

Washer, or clamping plate 230, is similar to the washers described in connection with FIGS. 41 through 46, but here includes gripping protuberances 232 provided on both upper and lower surfaces 230*a* and 230*b* of the washer so that the washer can be positioned over the screw with either side up. As before, protuberances 232 function to securely clamp electrical conductors or wires of the same or differing diameters. In FIG. 53, the conductors are shown as a large-diameter, solid-wire conductor 200 and a small-diameter, solid-wire conductor 202.

As before, washer 230 includes a body portion provided with a centrally disposed aperture 236. As indicated in FIG. 56, aperture 236 is provided with first and second oppositely sloping side walls 236*a* and 236*b*. At both the upper and lower surfaces of the washer, aperture 236 is generally circular in shape with the upper and lower circles being substantially the same in diameter. With this construction, the washer can, once again, tilt freely about the upper portion of shank 190*a* without regard for which side of the washer is up.

As in the embodiment of the invention shown in FIGS. 41 through 46, portions of the upper surface of the washer itself form the screw head engaging means about which the body portion of the washer can tilt relative to the head of the screw 190. These surface portions are located on either side of aperture 236 and are indicated in FIG. 53 by the numerals 237*a* and 237*b*. An important advantage of this latest washer design resides in the fact that the washer will function at any 90 degree orientation as opposed to 180 degree orientation required in the earlier described embodiments and, as previously mentioned can be placed over the screw shank with either side up.

Gripping protuberances 232, which positively grip the wire conductors 200 and 202, the gripping means here comprise four, spaced-apart, generally circular-shape gripping protuberances 232 provided on each of the top and bottom surfaces of the washer. Gripping protuberances 232 function in the same way as the gripping protuberances 32 described in connection the first form of the invention shown in FIGS. 1 through 7.

Turning next to FIGS. 57 through 59, yet another form of the invention is there shown. This form of the invention is similar in some respects to that shown in FIGS. 50 through 52 in that washer 240 of this embodiment also includes an upstanding collar 242 of slightly different shape which comprises the head engaging means about which the washer body can tilt. As best seen in FIG. 57, collar 242 comprises a generally conically shaped center hole 244 having a body portion 244*a* which terminates in an upper, screw head engaging periphery 244*b*. With this novel design the device can once again function at any 90 degree orientation with peripheral portion 244*b* engaging the lower surface of the screw to cause the washer to tilt relative to the axis of the screw.

Provided on the lower surface of the gripping plate, or washer body 240, is gripping means for gripping wire conductors 230 and 232. These gripping means are identical to those shown in FIGS. 1 through 7 and comprise spaced-apart gripping members 32 which are generally circular in shape. Once again, gripping members 32 function in the same manner as previously described.

Turning finally to FIGS. 60 through 63, still another form of tilt washer of the invention is there illustrated. This washer, which is generally designated by the numeral 250, is unique in that it is "unsided". That is, as will presently be described, either side of the washer can be disposed proximate the undersurface of the screw head.

As best seen in FIGS. 60 and 63, washer 250 is provided with a central aperture 252 to receive the screw and includes first and second surfaces 250*a* and 250*b* each of which is provided with circular gripping means of the character shown in FIG. 1 and 2 and generally designated by the numeral 32. Gripping members 32 include gripping ridges 32*a* and are formed in the same manner and function in the same way as previously described save that only the gripping means on the surface of the washer disposed proximate the electrical wires bite into the wires.

The screw head engaging means of this latest form of the invention comprise spaced-apart pairs of finger like members 254 which are formed by lancing, or piercing the washer body on opposite sides of aperture 252. The lancing step is accomplished so that one of each of the pairs of members 254 as, for example, members 254*a* extend outwardly from first surface 250*a* while the other of each pair of members as, for example, members 254*b* extend outwardly from second surface 250*b* (see FIG. 63).

With the construction illustrated in FIGS. 60 through 63, prior to tightening the screw to the terminal block, the conductor wires are inserted between the terminal and the properly oriented washer in the manner previously described so that the wires span the gripping protuberances. As the screw is tightened relative to the terminal, the screw head engaging means, or one pair of finger-like members 254 of the washer will more into engagement with the undersurface of the screw head and one pair of gripping means move into engagement with the larger diameter electrical conductor. Continued tightening of the screw will cause the washer to tilt or pivot relative to the screw head so that the second pair of gripping protuberances move into gripping engagement with the smaller diameter electrical conductor. A continued tightening of the screw will then cause ridges to bite into and securely grip both the larger and smaller diameter conductors.

As peviously mentioned, each side of the tilt washer of this latest form of the invention is of the same configuration so that the washer is "unsided". Therefore the washer can advantageously be placed within the connector assembly of the character shown in FIG. 57 with either side of the washer disposed adjacent the undersurface of the screw. This construction is very useful in many industrial applications and is particularly useful in situations wherein the connector assembly is assembled using automated production line techniques.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following claims.

I claim:

1. A connector assembly to which electrical wires can be detachably connected comprising:

(a) a threaded member having a shank portion and a head portion, said head portion having a generally flat undersurface;

(b) a clamping plate including:

(i) a central portion having a transverse center line and an aperture for receiving said shank portion of said threaded member, said central portion having a surface defining a central plane;

(ii) a first portion connected to said central portion on one side of said transverse center line, said first portion having a surface defining a first side plane; and (iii) a second portion connected to said central portion on the other side of said transverse center line, said second portion having a surface defining a second side plane;

(c) screw-head engaging means provided on at least one of said central, first side and second side portions of said clamping plate for engaging the undersurface of said head portion of said threaded member; and (d) gripping means provided on said clamping plate for gripping a wire placed below said clamping plate said gripping means comprising a second generally circular shaped gripping protuberance having a wire engaging ridge.

2. A connector assembly as defined in claim 1 in which said wire-engaging ridge of said gripping protuberance is disposed within a plane that extends angularly with respect to said central plane.

3. A connector assembly as defined in claim 1 in which said central plane, said first-side plane and said second-side plane are substantially coplanar.

4. A connector assembly as defined in claim 1 in which both said first-side plane and said second-side plane extend angularly with respect to said central plane.

5. A connector assembly as defined in claim 1 in which said first-side plane and said second-side plane are substantially parallel to and spaced apart from said central plane.

6. A connector assembly as defined in claim 1 in which said first-side plane and said central plane are substantially coplanar and in which said second-side plane is substantially parallel to and spaced apart from said central plane.

7. A connector assembly as defined in claim 1 in which said connector assembly includes a terminal block having a threaded bore for threadably receiving said threaded member and in which said clamping plate further includes means for blocking rotation of said clamping plate relative to said terminal block.

8. A connector assembly as defined in claim 1 in which said aperture of said central portion of said clamping plate includes a sloping wall.

9. A connector assembly as defined in claim 1 in which said screw-head engaging means comprises a pair of upstanding protuberances provided on said central portion of said clamping plate.

10. A connector as defined in claim 1 in which said screw-head engaging means comprises a pair of generally semi-hemispherical shaped protuberances provided on said central portion of said clamping plate.

11. A connector assembly as defined in claim 1 in which said screw-head engaging means comprises a portion of said surface of at least one of said first and second side portions.

12. A connector assembly as defined in claim 1 in which said screw-head engaging means comprises an upstanding wall circumscribing said aperture formed in said central portion of said connector plate.

13. A connector assembly as defined in claim 12 in which said upstanding wall has the shape of an inverted cone.

14. A connector assembly as defined in claim 12 in which said upstanding wall terminates in a generally circular shaped screw-head engaging surface.

15. A washer for use in connection with a screw having a shank portion having a longitudinal axis and a head portion, including an undersurface, said washer comprising:

(a) a body having a transverse center line, a longitudinal center line, a central portion having a surface defining a central plane, a first portion connected to said central portion having a surface defining a first-side plane and a second portion connected to said central portion having a surface defining a second-side plane, said body having a centrally disposed aperture for receiving the shank of the screw and being pivotable generally about the longitudinal axis of the screw between a first position wherein said central plane is generally perpendicular to the longitudinal axis of the screw to a second position;

(b) screw-head engaging means provided on said body for engaging the undersurface of the screw head upon tightening the screw; and (c) gripping means provided on said body for gripping an electric wire, said gripping means comprising first and second protuberances disposed on either side of said transverse center line of said body and extending therefrom, each of said protuberances having a generally circular shaped wire gripping ridge.

16. A washer as defined in claim 15 in which said wire-gripping ridges of said gripping protuberances are disposed within planes that extend angularly with respect to said central plane.

17. A washer as defined in claim 15 in which said central plane, said first-side plane and said second-side plane are substantially coplanar.

18. A washer as defined in claim 15 in which both said first-side plane and said second-side plane extend angularly with respect to said central plane.

19. A washer as defined in claim 15 in which said first-side plane and said second-side plane are substantially parallel to and spaced apart from said central plane.

20. A washer as defined in claim 15 in which said first-side plane and said central plane are substantially coplanar and in which said second-side plane is substantially parallel to and spaced apart from said central plane.

21. A washer as defined in claim 15 in which said body has an upper surface and a lower surface and in which said gripping means comprises protuberances disposed on both said upper and lower surfaces.

22. A washer as defined in claim 15 in which said aperture of said central portion is generally elliptical in shape.

23. A washer as defined in claim 15 in which said screw-head engaging means comprises a pair of upstanding protuberances provided on said central portion of said clamping plate, said protuberances being generally hemispherical in shape.

24. A washer as defined in claim 15, in which said screw-head engaging means comprises a portion of said surface of at least one of said first and second portions.

25. A washer as defined in claim 15 in which said screw-head engaging means comprises an upstanding wall circumscribing said aperture formed in said central portion of said body.

26. A washer for use in connection with a screw having a shank portion having a longitudinal axis and a head portion, including an undersurface, said washer comprising:

(a) a body having first and second substantially planar surfaces defining first and second substantially parallel planes, said body having a generally centrally disposed aperture for receiving the shank of the screw and being pivotable generally about the longitudinal axis of the screw between a first position wherein said central plane is generally perpendicular to the longitudinal axis of the screw to a second position;

(b) screw-head engaging means provided on said body for engaging the undersurface of the screw head upon tightening the screw; and (c) gripping means provided on both said first and second surfaces of said body for gripping an electric wire, said gripping means comprising a plurality of spaced-apart protuberances disposed on said first and second surfaces of said body and extending therefrom.

27. A washer as defined in claim 26 in which each of said protuberance has a generally circular shaped wire gripping a ridge.

28. A washer as defined in claim 26 in which said screw head engaging means comprise a pair of spaced-apart, finger-like members extending outwardly from said first surface of said body.

29. A washer as defined in claim 26 in which said screw head engaging means comprise a pair of finger-like members extending outwardly from both said first and second surfaces of said body.

30. A washer as defined in claim 29 in which said finger-like members are integrally formed with said body.

31. A washer as defined in claim 30 in which said finger-like members are formed by lancing said body.

* * * * *